(12) United States Patent
Yang et al.

(10) Patent No.: US 8,938,749 B2
(45) Date of Patent: Jan. 20, 2015

(54) SYSTEM AND METHOD TO TROUBLESHOOT A SET TOP BOX DEVICE

(75) Inventors: Chen-Yui Yang, Marlboro, NJ (US); Paritosh Bajpay, Edison, NJ (US); Zhi Li, San Ramon, CA (US); David Lu, Morganville, NJ (US); Balaji Puli, San Ramon, CA (US); Raghvendra Savoor, Walnut Creek, CA (US); Anthony Srdar, Dawsonville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 614 days.

(21) Appl. No.: 12/872,393

(22) Filed: Aug. 31, 2010

(65) Prior Publication Data
US 2012/0054785 A1 Mar. 1, 2012

(51) Int. Cl.
| | |
|---|---|
| *H04H 60/32* | (2008.01) |
| *H04N 21/254* | (2011.01) |
| *H04N 21/442* | (2011.01) |
| *H04N 21/4425* | (2011.01) |
| *H04N 21/6547* | (2011.01) |
| *H04N 21/658* | (2011.01) |

(52) U.S. Cl.
CPC ............. *H04H 60/32* (2013.01); *H04N 21/254* (2013.01); *H04N 21/4424* (2013.01); *H04N 21/4425* (2013.01); *H04N 21/6547* (2013.01); *H04N 21/6582* (2013.01)
USPC .............................................. 725/16; 725/14

(58) Field of Classification Search
CPC ... H04N 17/00; H04N 17/04; H04N 21/2404; H04N 21/4425; H04N 21/6473; G06F 11/30
USPC ........................................................ 725/16, 14
See application file for complete search history.

(56) References Cited

U.S. PATENT DOCUMENTS

| | | | |
|---|---|---|---|
| 6,005,569 A | 12/1999 | Breggin | |
| 6,023,724 A | 2/2000 | Bhatia et al. | |
| 6,205,579 B1 | 3/2001 | Southgate | |
| 6,452,915 B1 | 9/2002 | Jorgensen | |
| 6,588,016 B1* | 7/2003 | Chen et al. ..................... 725/111 |

(Continued)

OTHER PUBLICATIONS

Darrell Taylor, Alfonso Jones, Steven McDonald, "Residential Gateway," U.S. Appl. No. 12/545,940, filed Aug. 24, 2009, 36 pages.

(Continued)

*Primary Examiner* — Nicholas Corbo
*Assistant Examiner* — Alexander Q Huerta
(74) *Attorney, Agent, or Firm* — Toler Law Group, PC

(57) ABSTRACT

A computer-implemented method includes receiving, at a monitoring center of a media distribution network, from a set top box device associated with a customer account, first error data indicating occurrence of a first error at the set top box device at a first time. The set top box device is at least partially functional after occurrence of the first error. The computer-implemented method includes receiving, at the monitoring center, second error data indicating occurrence of a second error at the set top box device at a second time. The set top box device is at least partially functional after occurrence of the second error. The computer-implemented method includes determining an elapsed time between the first time and the second time. The computer-implemented method includes automatically generating a trouble ticket indicating failure of the set top box device when the elapsed time satisfies a first threshold.

20 Claims, 17 Drawing Sheets

(56) References Cited

U.S. PATENT DOCUMENTS

| | | | |
|---|---|---|---|
| 6,643,801 B1 * | 11/2003 | Jammu et al. | 714/37 |
| 6,658,598 B1 | 12/2003 | Sullivan | |
| 6,826,512 B2 | 11/2004 | Dara-Abrams et al. | |
| 7,200,527 B1 | 4/2007 | Davidov et al. | |
| 7,392,301 B1 | 6/2008 | Perry, Jr. et al. | |
| 7,810,127 B2 * | 10/2010 | Stanek et al. | 725/129 |
| 7,818,631 B1 * | 10/2010 | Halikhedkar et al. | 714/48 |
| 8,094,568 B1 | 1/2012 | Croak et al. | |
| 2001/0011375 A1 * | 8/2001 | Yun | 725/107 |
| 2002/0091966 A1 * | 7/2002 | Barton et al. | 714/25 |
| 2002/0167936 A1 | 11/2002 | Goodman | |
| 2002/0167937 A1 | 11/2002 | Goodman | |
| 2003/0023980 A1 | 1/2003 | Kikinis et al. | |
| 2003/0137587 A1 | 7/2003 | Braun | |
| 2003/0163380 A1 | 8/2003 | Vaccarelli et al. | |
| 2004/0019691 A1 | 1/2004 | Daymond et al. | |
| 2004/0031059 A1 * | 2/2004 | Bialk et al. | 725/129 |
| 2004/0054771 A1 * | 3/2004 | Roe et al. | 709/224 |
| 2004/0056958 A1 | 3/2004 | Lee | |
| 2004/0068541 A1 * | 4/2004 | Bayassi et al. | 709/204 |
| 2004/0093370 A1 * | 5/2004 | Blair et al. | 709/200 |
| 2005/0025162 A1 | 2/2005 | Binder | |
| 2005/0028208 A1 * | 2/2005 | Ellis et al. | 725/58 |
| 2005/0081079 A1 * | 4/2005 | Cheston et al. | 714/2 |
| 2005/0081118 A1 | 4/2005 | Cheston et al. | |
| 2005/0183130 A1 | 8/2005 | Sadja et al. | |
| 2005/0204200 A1 * | 9/2005 | Gadangi et al. | 714/38 |
| 2005/0204397 A1 * | 9/2005 | Miyazoe et al. | 725/107 |
| 2006/0098742 A1 | 5/2006 | Meenakshisundaram et al. | |
| 2006/0233313 A1 | 10/2006 | Adams, Jr. et al. | |
| 2007/0050836 A1 | 3/2007 | Stanek et al. | |
| 2007/0192800 A1 | 8/2007 | Walter et al. | |
| 2008/0022336 A1 * | 1/2008 | Howcroft et al. | 725/100 |
| 2008/0126250 A1 | 5/2008 | Chen | |
| 2008/0133978 A1 | 6/2008 | Angamuthu et al. | |
| 2008/0192119 A1 | 8/2008 | Li et al. | |
| 2008/0250443 A1 | 10/2008 | Fan et al. | |
| 2008/0267215 A1 | 10/2008 | Blackburn et al. | |
| 2008/0288977 A1 | 11/2008 | Howcroft et al. | |
| 2009/0064251 A1 * | 3/2009 | Savoor et al. | 725/110 |
| 2009/0125953 A1 | 5/2009 | Porter et al. | |
| 2009/0142036 A1 * | 6/2009 | Branam et al. | 386/83 |
| 2009/0161530 A1 | 6/2009 | Yang et al. | |
| 2009/0232008 A1 | 9/2009 | Wurst et al. | |
| 2009/0299699 A1 | 12/2009 | Wu | |
| 2009/0307612 A1 | 12/2009 | Singh et al. | |
| 2010/0023994 A1 | 1/2010 | Taylor et al. | |
| 2010/0054136 A1 | 3/2010 | Mehta et al. | |
| 2010/0153787 A1 * | 6/2010 | Beattie et al. | 714/43 |
| 2010/0172297 A1 * | 7/2010 | Amerga et al. | 370/328 |
| 2010/0332906 A1 | 12/2010 | Agrawal et al. | |
| 2011/0107389 A1 * | 5/2011 | Chakarapani | 725/132 |
| 2011/0113290 A1 | 5/2011 | Chana et al. | |
| 2011/0225619 A1 | 9/2011 | Kesireddy et al. | |
| 2012/0151549 A1 | 6/2012 | Kumar et al. | |

OTHER PUBLICATIONS

Shiv Kumar, Paritosh Bajpay, Jackson Liu, Narendra Ravi, Raghvendra G. Savoor, "Locally Diagnosing and Troubleshooting Service Issues," U.S. Appl. No. 12/727,931, filed Mar. 19, 2010, 38 pages.

* cited by examiner

SYSTEM AND METHOD TO TROUBLESHOOT A SET TOP BOX DEVICE

FIELD OF THE DISCLOSURE

The present disclosure is generally related to troubleshooting a set top box device.

BACKGROUND

A service provider may offer media content to subscribers via a private network. The service provider may provide customer premises equipment, such as set top box (STB) devices and digital video recorders (DVRs), to enable the subscribers to view and record the media content. When subscribers experience problems with their STBs and DVRs, the subscribers may call and speak to a customer service representative to diagnose and resolve the problems. Troubleshooting customer premises equipment can be a significant expense associated with providing media content to subscribers.

DETAILED DESCRIPTION

In a particular embodiment, a computer-implemented method includes receiving, at a monitoring center of a media distribution network, from a set top box device associated with a customer account, first error data indicating occurrence of a first error at the set top box device at a first time. The set top box device is at least partially functional after occurrence of the first error. The computer-implemented method includes receiving, at the monitoring center, second error data indicating occurrence of a second error at the set top box device at a second time. The set top box device is at least partially functional after occurrence of the second error. The computer-implemented method includes determining an elapsed time between the first time and the second time. The computer-implemented method includes automatically generating a trouble ticket indicating failure of the set top box device when the elapsed time satisfies a first threshold, such as when the elapsed time is less than a threshold time period.

In another particular embodiment, a system includes a processor and a non-transitory computer-readable storage medium including operational instructions. The operational instructions are executable by the processor to receive, from a set top box device associated with a customer account, first error data indicating occurrence of a first error at the set top box device at a first time. The set top box device is at least partially functional after occurrence of the first error. The operational instructions are executable by the processor to receive second error data indicating occurrence of a second error at the set top box device at a second time. The set top box device is at least partially functional after occurrence of the second error. The operational instructions are also executable by the processor to automatically generate a trouble ticket to indicate a failure of the set top box device when an elapsed time between the first time and the second time satisfies a first threshold.

In another particular embodiment, a non-transitory computer-readable storage medium includes operational instructions that, when executed by a processor, cause the processor to receive, from a set top box device associated with a customer account, first error data indicating occurrence of a first error at the set top box device at a first time. The set top box device is at least partially functional after occurrence of the first error. The operational instructions are executable by the processor to receive second error data indicating occurrence of a second error at the set top box device at a second time. The set top box device is at least partially functional after occurrence of the second error. The operational instructions are also executable by the processor to automatically generate a trouble ticket to indicate a failure of the set top box device when an elapsed time between the first time and the second time satisfies a first threshold.

Figure 1:
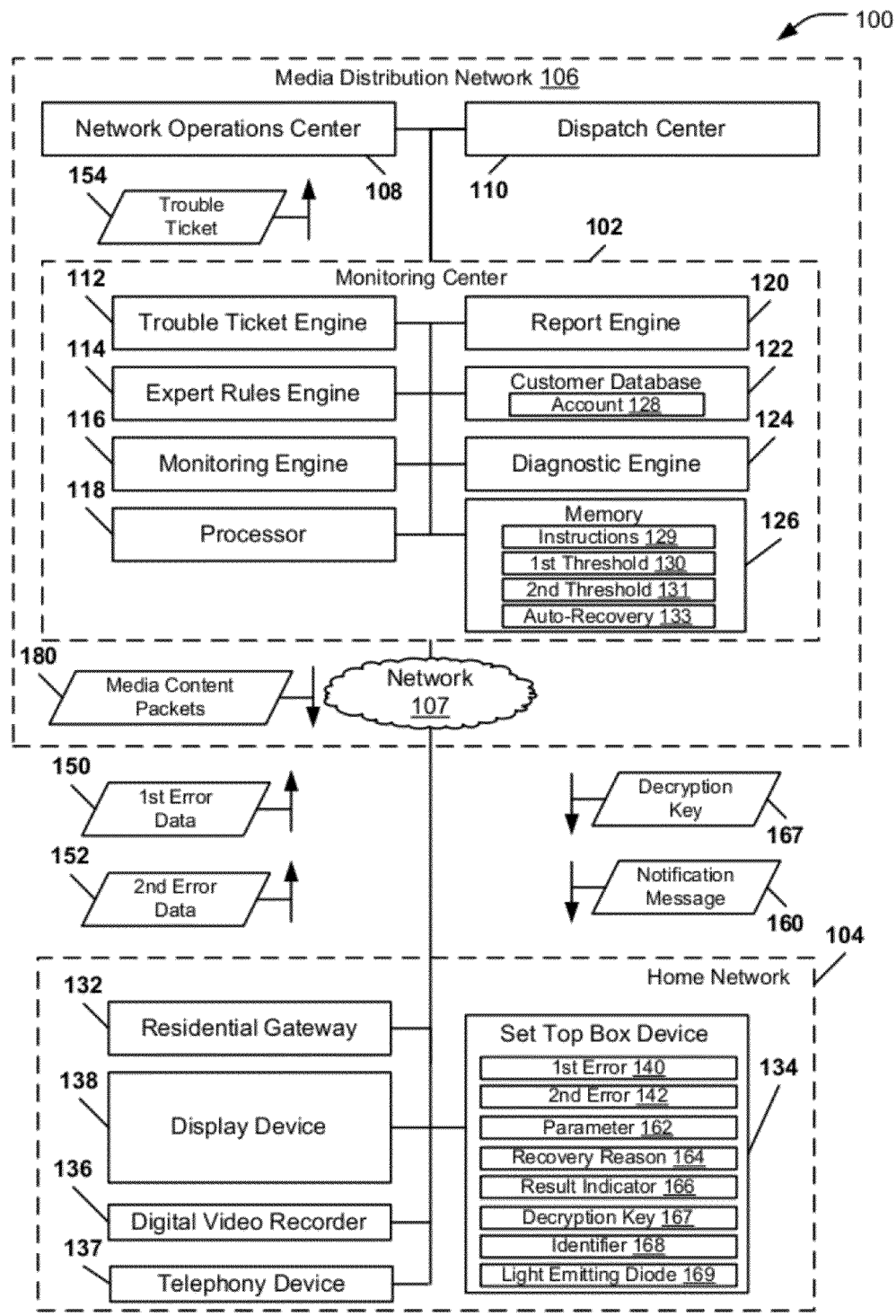
FIG. 1 is a block diagram of a first particular embodiment of a system to troubleshoot a set top box device.

Referring to FIG. 1, a block diagram of a first particular embodiment of a system to troubleshoot a set top box device is depicted and generally designated 100. The system 100 includes a home network 104 coupled to a media distribution network 106 via a network 107. The system 100 may be used to troubleshoot a set top box device 134 in the home network 104.

The media distribution network 106 may distribute media content via media content packets 180 to one or more set top box devices, such as the set top box device 134. The media content packets 180 may include television programs, movies, pay-per-view entertainment, audio content, video games, another type of media content, or any combination thereof. The media distribution network 106 includes a network operations center 108, a dispatch center 110, and a monitoring center 102. The network operations center 108 and the dispatch center 110 may be associated with the monitoring center 102. The network operations center 108 may be manned by network technicians that monitor the status of at least a portion of the network 107. The dispatch center 110 may be operable to receive instructions from the network operations center 108 to dispatch a technician to a particular location (e.g., a location of the home network 104) to repair or replace customer premises equipment (e.g., the set top box device 134).

The monitoring center 102 may be an unmanned, fully automated hardware platform that executes software instructions to monitor customer premises equipment and to alter the network operations center 108 when a problem is detected or predicted. The monitoring center 102 includes a trouble ticket engine 112, an expert rules engine 114, a monitoring engine 116, a processor 118, a report engine 120, a customer database 122, a diagnostic engine 124, and a memory 126. The memory 126 may include instructions 129 that are executable by the processor 118 to perform various functions as described herein. The monitoring center 102 may be operable to monitor devices coupled to the network 107. For example, the monitoring center 102 may monitor devices associated with subscribers to services provided by the media distribution network 106. To illustrate, the monitoring engine 116 may monitor devices of the home network 104 that are coupled to the network 107.

When the monitoring engine 116 detects an error with a particular device that is coupled to the network 107, the monitoring engine 116 may instruct the diagnostic engine 124 to diagnose the error. The diagnostic engine 124 may analyze the error based on the expert rules engine 114. The expert rules engine 114 may include rules identifying root causes of errors and one or more solutions for attempting to solve the errors. The diagnostic engine 124 may attempt to solve the error automatically by sending one or more messages to the device to diagnose and resolve the error with the particular device. For example, the diagnostic engine 124 may send a message that instructs the particular device to retrieve one or more diagnostic parameters, such as parameter 162. In response to receiving and analyzing the diagnostic parameters from the particular device, the diagnostic engine 124 may instruct the particular device to perform a corrective action, such as a reboot or a power cycle, to resolve the error. Power cycling includes turning power off to the particular device for a particular period of time and then turning the power on again.

When the diagnostic engine 124 is unable to resolve the error, the diagnostic engine 124 may instruct the trouble ticket engine 112 to generate a trouble ticket 154. The network operations center 108 may receive the trouble ticket 154 and instruct the dispatch center 110 to dispatch a technician to repair or replace the particular device.

The report engine 120 may instruct the diagnostic engine 124 to generate a notification message 160 that documents the problem and the solution. For example, the notification message 160 may indicate that the problem was diagnosed as a defective device (e.g., the set top box device 134) and the solution is to dispatch a technician to replace the defective set top box 134 device with a new set top box device (not shown). The notification message 160 may be sent to a communication address associated with a subscriber, such as an email address, a voice mail address, text message address, another address, or any combination thereof. The instructions 129 may be executable by the processor 118 to perform the various functions of the monitoring center 102, such as the monitoring engine 116, the expert rules engine 114, the trouble ticket engine 112, the report engine 120, and the diagnostic engine 124.

The network 107 may be a private media content delivery network. The network 107 may include a public switched telephone network (PSTN), a wireless network, an optical network, a data network, another type of network, or any combination thereof. In a particular embodiment, the network 107 is an Internet Protocol Television (IPTV) network.

The home network 104 may include multiple devices, such as a residential gateway 132, the set top box device 134, a digital video recorder 136, a telephony device 137, and a display device 138. The set top box device 134 may receive media content via media content packets 180 from the media distribution network 106. The set top box device 134 may decrypt and decode the media content from the media content packets 180 for display at the display device 138. In a particular embodiment, the digital video recorder 136 is a standalone device associated with the set top box device 134. In another particular embodiment, the digital video recorder 136 is integrated with the set top box device 134. The digital video recorder 136 may record the media content packets 180 received from the media distribution network 106. The telephony device 137 may be an IP-based telephony device, such as a Voice over Internet Protocol (VoIP) device. The residential gateway 132 may be operable to provide one or more services, such as media content, telephony services, and Internet access, to the devices of the home network 104.

In operation, the set top box device 134 may receive the media content packets 180 from the media distribution network 106. In FIG. 1, the set top box device 134 is illustrated as having a first error 140 and a second error 142. However, it should be understood that any one of the devices in the home network 104, such as the residential gateway 132, the digital video recorder 136, the telephony device 137 and the display device 138, may encounter the errors 140 and 142. When the set top box device 134 encounters the first error 140, the set top box device 134 may send first error data 150 to the monitoring center 102. The monitoring center 102 may receive the first error data 150 that indicates an occurrence of the first error 140 at the set top box device 134 at a first time. The set top box device 134 may be at least partially functional after occurrence of the first error 140.

The set top box device 134 may encounter the second error 142 and may send second error data 152 to the monitoring center 102. The second error data 152 may indicate an occurrence of the second error 142 at the set top box device 134 at a second time. The set top box device 134 may be at least partially functional after the occurrence of the second error 142. In response to receiving the first error data 150 and the second error data 152, the monitoring center 102 may determine an elapsed between the first time (e.g., when the first error 140 occurred) and the second time (e.g., when the second error 142 occurred). When the elapsed time between the occurrence of the first error 140 and the second error 142 satisfies a threshold (e.g., five days) the monitoring center 102 may automatically generate a trouble ticket 154. The trouble ticket 154 may indicate a failure of the set top box device 134. The report engine 120 may send the notification message 160 to a communication address of an account 128 that is associated with the home network 104. The notification message 160 may indicate that the set top box device 134 is to be repaired. For example, the notification message 160 may be sent to the telephony device 137 to notify a subscriber associated with the account 128 that a technician is being dispatched to repair or replace the customer premises equipment (e.g., one of the devices 132, 134, 136, 137, and 138) that sent the error data 150 and 152. The notification message 160 may be sent to the telephony device 137 in the form of a text message or an interactive voice response call. The notification message 160 may also be sent to a computing device (not shown) associated with the account 128. When the set top box device 134 is at least partially functional, the notification message 160 may be sent to the set top box device 134 for display at the display device 138.

When the elapsed time between the occurrence of the first error 140 and the second error 142 does not satisfy the first threshold 130, the monitoring engine 116 may determine an average elapsed time between errors (including the errors 140 and 142) occurring at the set top box device 134 for a particular time period. For example, the monitoring engine 116 may determine an average elapsed time between errors occurring at the set top box device 134 in the past month, in the past two months, in the past three months, in the past six months, in the past year, etc. When the average elapsed time between errors at the set top box device 134 satisfies a second threshold 131, the trouble ticket engine 112 may automatically generate the trouble ticket 154 indicating failure of the set top box device 134.

the decryption key 167 to the set top box device 134 when the identifier 168 is valid. For example, the media content packets 180 may be encrypted to prevent unauthorized access to the media content of the media content packets 180. The set top box device 134 may use the decryption key 167 to decrypt the media content of the media content packets 180 to enable to media content to be displayed at the display device 138.

When a customer encounters a problem with a device in the home network 104, the customer may call the network operations center 108. A customer service representative at the network operations 108 might attempt to solve the problem by instructing the customer to perform various actions, such as manually power cycling the set top box device 134 or the digital video recorder 136. The table below provides examples of instructions that the customer service representative may use to attempt to solve a customer problem.

| Problem | Instructions to Customer |
| --- | --- |
| STB is "stuck" (e.g., a percentage of task complete indicator is stuck, update in progress message on the screen is stuck, etc.) | Advise customer to manually power cycle the STB (e.g. unplug/plug-in the power cord of the STB) |
| STB responds slowly when Menu or Guide is accessed | Advise customer that the network operations center has noted this issue and is pursuing a resolution |
| Latency Issue | Advise customer to manually power cycle the STB (e.g. unplug/plug-in the power cord of the STB) |
| STB crashed when customer fast forwarded through photos in a photo sharing application | Allow STB to restart and recover from crash |
| Pressing the record button on a remote control device does not enable Customer to record on non-DVR receiver | Advise customer to manually power cycle the STB (e.g. unplug/plug-in the power cord of the STB) |

The diagnostic engine 124 may automatically troubleshoot the set top box device 134 to identify a cause of at least one of the first error 140 and the second error 142 based on the expert rules engine 114. For example, when at least one of the first error 140 and the second error 142 indicate a problem at one of the devices in the home network 104, the home network 104 may be analyzed to identify a root cause of the problem. When the root cause of the problem is associated with the set top box device 134, an automatic recovery procedure 133 may be executed in order to resolve the errors 140 and 142 with the set top box device 134. The automatic recovery procedure 133 may include retrieving at least one parameter, such as the parameter 162, from the set top box device 134. A recovery reason 164 may set based on the parameter 162. A result indicator 166 may be set based on the parameter 162. For example, the recovery reason 164 may indicate at a diagnostic device (not shown) why the error occurred and the result indicator 166 may visually indicate a status of the set top box device 134. To illustrate, the result indicator 166 may cause a Light Emitting Diode (LED) 169 of the set top box device 134 to display a green color when the automatic recovery procedure 133 has successfully resolved the errors 140 and 142. The result indicator 166 may cause the LED 169 to display a yellow color when the automatic recovery procedure 133 has successfully resolved one of the errors 140 and 142. The result indicator 166 may cause the LED 169 to display a red color when the automatic recovery procedure 133 has not resolved the errors 140 and 142. For example, the LED 169 may display a red color when the set top box device 134 is to be repaired or replaced by a technician. When the root cause of the errors 140 and 142 is a missing decryption key 167, the monitoring center 102 may authenticate an identifier 168 associated with the set top box device 134 and send In the system described in FIG. 1, the monitoring center 102 can automatically detect and automatically resolve problems that occur in the home network 104 without the customer having to call the network operations center 108. For example, the monitoring center 102 may receive the error data 150 and 152 from a device, such as the set top box device 134. The error data 150 and 152 may indicate a problem that has occurred at the device. The monitoring center 102 may perform various actions to correct the problem based on the error data 150 and 152. For example, the monitoring center 102 may automatically generate the trouble ticket 154 to instruct the network operations center 108 to dispatch a technician from the dispatch center 110 to repair or replace the device that sent the error data 150 and 152. The monitoring center 102 may automatically retrieve one or more parameters, such as the parameter 162, from the device to further diagnose the problem. When the monitoring center 102 determines that the set top box device 134 has lost the decryption key 167, the monitoring center 102 may automatically validate the identifier 168 and automatically send the decryption key 167 to the set top box device 134. The monitoring center 102 may automatically send a notification message 160 to inform the subscriber associated with the account 128 about the errors 140 and 142 and the remedial action(s) being taken to correct the errors 140 and 142. In this way, the monitoring center may automatically identify and resolve the problem and notify the subscriber of the resolution without the need for the subscriber to speak to a customer service representative of the service provider of the media distribution network 106. This may result in greater customer satisfaction among subscribers because the monitoring center 102 may quickly resolve problems without each of the subscribers having to speak to a customer service representative. The service provider of the media distribution network 106 may reduce costs by reducing a number of customer service representatives.

Figure 2:
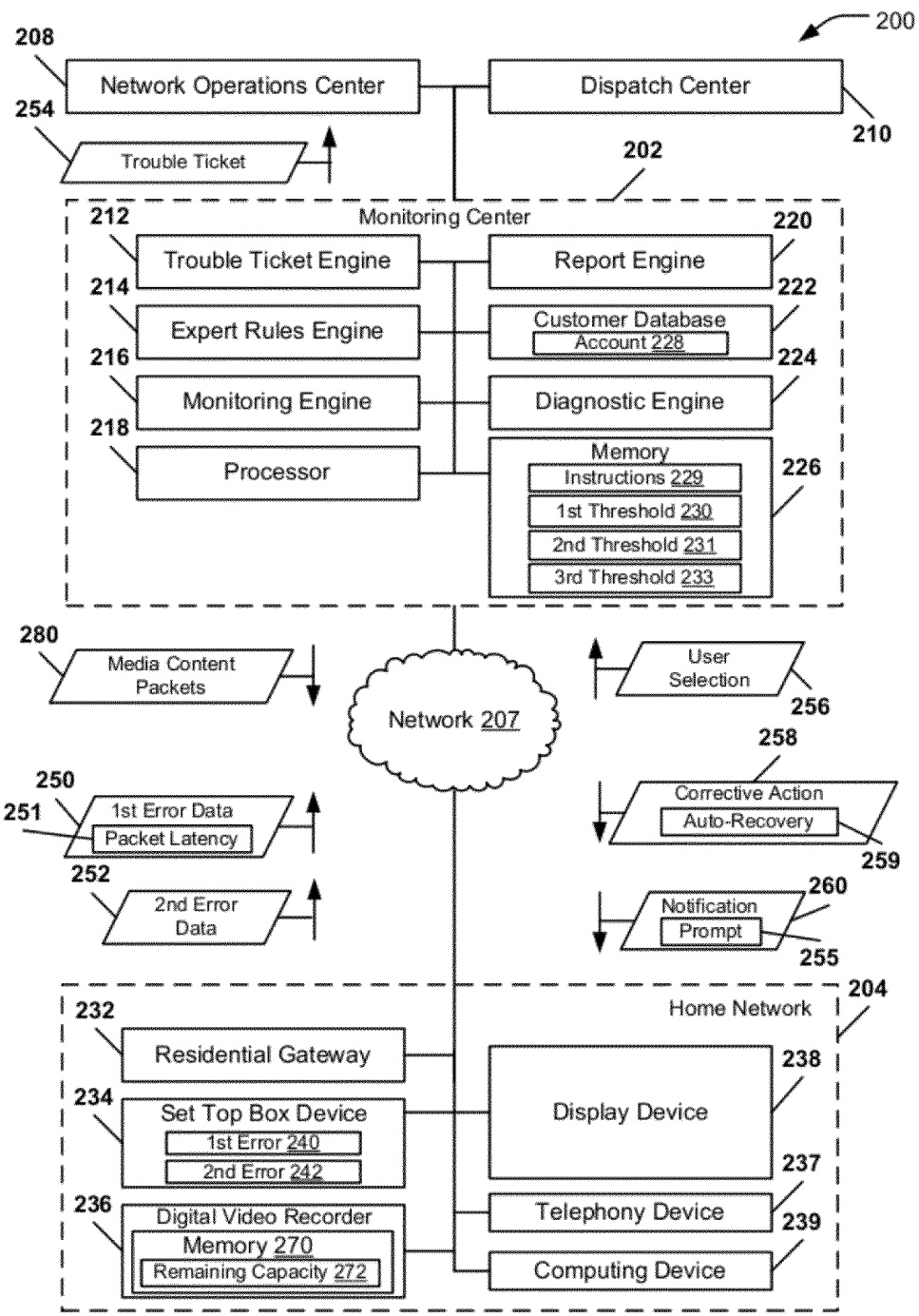
FIG. 2 is a block diagram of a second particular embodiment of a system to troubleshoot a set top box device.

Referring to FIG. 2, a block diagram of a second particular embodiment of a system to troubleshoot a set top box device is depicted and generally designated 200. The system 200 includes a home network 204 coupled to a monitoring center 202 via a network 207. A network operations center 208 and a dispatch center 210 are coupled to the monitoring center 202. The system 200 may be used to troubleshoot a device, such as a set top box device 234, in the home network 204.

The network 207 may be a private media content delivery network. The network 207 may be operable to distribute media content via media content packets 280 to one or more set top box devices, such as the set top box device 234. The media content may include television programs, movies, pay-per-view entertainment, audio content, video games, another type of media content, or any combination thereof. The network 207 may include a public switched telephone network (PSTN), a wireless network, an optical network, a data network, another type of network, or any combination thereof. In a particular embodiment, the network 207 is an Internet Protocol Television (IPTV) network.

The network operations center 208 and the dispatch center 210 may be associated with the monitoring center 202. The network operations center 208 may be manned by network technicians that monitor the status of at least a portion of the network 207. The dispatch center 210 may receive instructions from the network operations center 208 to dispatch a technician to a particular location (e.g., a location of the home network 204) to repair or replace equipment (e.g., the set top box device 234).

The monitoring center 202 may be an unmanned, fully automated hardware platform that executes software instructions to monitor customer premises equipment and to alter the network operations center 108 when a problem is detected or predicted. The monitoring center 202 includes a trouble ticket engine 212, an expert rules engine 214, a monitoring engine 216, a processor 218, a report engine 220, a customer database 222, a diagnostic engine 224, and a memory 226. The instructions 229 may be executable by the processor 218 to perform the various functions of the monitoring center 202, such as the monitoring engine 216, the expert rules engine 214, the trouble ticket engine 212, the report engine 220, and the diagnostic engine 224. The monitoring center 202 may be operable to monitor devices coupled to the network 207. For example, the monitoring engine 216 may monitor devices of the home network 204 that are coupled to the network 207.

When the monitoring engine 216 detects an error with a particular device (e.g., the set top box device 234) that is coupled to the network 207, the monitoring engine 216 may instruct the diagnostic engine 224 to diagnose the error. The diagnostic engine 224 may analyze the error based on the expert rules engine 214. The expert rules engine 214 may include rules identifying root causes of errors and one or more solutions for solving the errors. The diagnostic engine 224 may correct the error by automatically sending one or more messages to the set top box device 234 to diagnose and resolve the error with the set top box device 234. For example, the diagnostic engine 224 may send a message that instructs the set top box device 234 to retrieve one or more diagnostic parameters. In response to receiving and analyzing the diagnostic parameters from the set top box device 234, the diagnostic engine 224 may instruct the set top box device 234 to perform a corrective action, such as a reboot or a power cycle, to resolve the error. Power cycling includes turning power off to the particular device for a particular period of time and then turning the power on again.

When the diagnostic engine 224 is unable to resolve the error or when the diagnostic engine 224 determines that the set top box device 234 is to be repaired or replaced, the diagnostic engine 224 may instruct the trouble ticket engine 212 to generate a trouble ticket 254. The network operations center 208 may receive the trouble ticket 254 and instruct the dispatch center 210 to dispatch a technician to repair or replace the set top box device 234.

The report engine 220 may instruct the diagnostic engine 224 to generate the notification 260 to document the problem and the solution identified by the monitoring center 202. For example, the notification 260 may indicate that the problem was diagnosed as a defective device (e.g., the set top box device 234 is defective) and the solution is to dispatch a technician to repair or replace the defective set top box device 234 with a new set top box device (not shown). The notification 260 may be sent to an address associated with a subscriber, such as an email address, a voice mail address, text message address, another address, or any combination thereof.

The home network 204 may include multiple devices, such as a residential gateway 232, the set top box device 234, a digital video recorder 236, a telephony device 237, a display device 238, and a computing device 239. The set top box device 234 may receive media content via media content packets 280 from the network 207. The set top box device 234 may decrypt and decode the media content from the media content packets 280 for display at the display device 238. In a particular embodiment, the digital video recorder 236 is a standalone device associated with the set top box device 234. In another particular embodiment, the digital video recorder 236 is integrated with the set top box device 234. The digital video recorder 236 may record the media content packets 280 received from the network 207. The telephony device 237 may be an IP-based telephony device, such as a Voice over Internet Protocol (VoIP) device. The residential gateway 232 may be operable to provide one or more services, such as media content, telephony services, and Internet access, to the devices of the home network 204. The computing device 239 may access the Internet via the residential gateway 232.

In operation, the set top box device 234 may receive the media content packets 280 via the network 207. The monitoring center 202 may receive first error data 250 indicating occurrence of a first error 240 at the set top box device 234. The first error 240 may occur at a first time. The set top box device 234 may be at least partially functional after occurrence of the first error 240. The monitoring center 202 may receive second error data at 252 at a second time. The second error data 252 may indicate occurrence of a second error 242 at the set top box device 234. The set top box device 234 may be at least partially functional after occurrence of the second error 242.

The monitoring engine 216 may determine an elapsed time between the occurrence of the first error 240 and the second error 242. When the elapsed time between the occurrence of the first error 240 and the second error 242 satisfies a first threshold 230, the monitoring engine 216 may instruct the trouble ticket engine 212 to generate a trouble ticket 254 to indicate a failure of the set top box device 234. In a particular embodiment, the first error data 250 and the second error data 252 may identify a packet latency 251 associated with receiving the media content packets 280 at the set top box device 234. The packet latency 251 may indicate a delay between when the media content packets 280 are sent and when the set top box device 234 receives the media content packets 280.

The trouble ticket engine 212 may automatically generate the trouble ticket 254 when the packet latency satisfies a second threshold 231.

In another particular embodiment, the first error data 250 and the second error date 252 may identify a remaining capacity 272 of the digital video recorder 236 associated with the set top box device 234. For example, when the remaining capacity 272 satisfies a first threshold 230, the digital video recorder may send the first error data 250 to the monitoring center 202. When the remaining capacity 272 satisfies a second threshold 231, the digital video recorder may send the second error data 252 to the monitoring center 202. In response to receiving the first error data 250 and the second error data 252 indicating the remaining capacity 272 of the digital video recorder 236, the monitoring center 202 may send the notification 260 to the home network 204. The notification 260 may be sent when the remaining memory capacity 272 satisfies a third threshold 233.

The notification 260 may be sent to an address associated with the account 228. The address may be associated with one of the set top box devices 234, the digital video recorder 236, the telephony device 237, the computing device 239, the telephony device 237, another device, or any combination thereof. For example, when the set top box device 234 is at least partially functional, the notification 260 may be sent to the set top box device 234 for display at the display device 238. The notification 260 may be sent to the telephony device 237 in the form of a text message or interactive voice response call. The notification 260 may be sent to the computing device 239 in the form of an e-mail. The notification 260 may include a prompt 255 to enable a corrective action to be taken. For example, the prompt 255 may prompt a subscriber to delete files older than a particular time period or date to increase the remaining capacity 272. In response to the prompt 255, the user may send a user selection 256 to the monitoring center 202. In response to receiving the user selection 256, the monitoring center 202 may send a corrective action 258 to a particular device of the home network 204. The corrective action 258 may include an automatic recovery procedure 259. For example, the automatic recovery procedure 259 may delete at least a portion of the media content stored at the digital video recorder 236 to increase the remaining capacity 272 of the memory 270. The automatic recovery procedure 259 may cause the particular device of the home network 204 to download and install a software or firmware update (not shown). The automatic recovery procedure 259 may cause the particular device of the home network 204 to perform a power cycle. The automatic recovery procedure 259 may cause the particular device of the home network 204 to retrieve one or more parameters of the device and send the parameters to the diagnostic engine 224 to perform a root cause analysis.

Thus, the monitoring center 202 may monitor the devices coupled to the network 207, such as the devices 232, 234, 236, 237, 238, and 239 in the home network 204. The monitoring center 202 may receive the error data 250 and 252 from one of the devices, such as the digital video recorder 236. The error data 250 and 252 may indicate a problem that has occurred at the device. The monitoring center 202 may perform various actions to correct the problem based on the error data 250 and 252. For example, the monitoring center 202 may automatically generate the trouble ticket 254 to instruct the network operations center 208 to dispatch a technician from the dispatch center 210 to repair or replace the device that sent the error data 250 and 252. The monitoring center 202 may automatically retrieve one or more parameters, such as the remaining capacity 272, from the device to further diagnose the problem. The monitoring center 202 may send the corrective action 258 to correct the errors 240 and 242. The corrective action 258 may include the automatic recovery procedure 259 to automatically correct the errors 240 and 242 without any human interaction. For example, the automatic recovery procedure 259 may cause the device to perform a power cycle or increase the remaining capacity 272 of the memory 270.

The monitoring center 202 may automatically send the notification 260 to inform the subscriber associated with the account 228 about the problem causing the errors 240, 242 and the remedial action(s) being taken to correct the errors 240, 242. In this way, the monitoring center 202 may automatically identify and resolve the problem and notify the subscriber of the resolution without the need for the subscriber to speak to a customer service representative of a service provider of the media content packets 280. This may result in greater customer satisfaction for subscriber because the monitoring center 202 may quickly resolve a particular problem without the subscriber having to speak to a customer service representative. The service provider of a media distribution network may reduce costs by reducing a number of customer service representatives that troubleshoot errors occurring in customer premises equipment, such as the set top box device 234.

Figure 3:
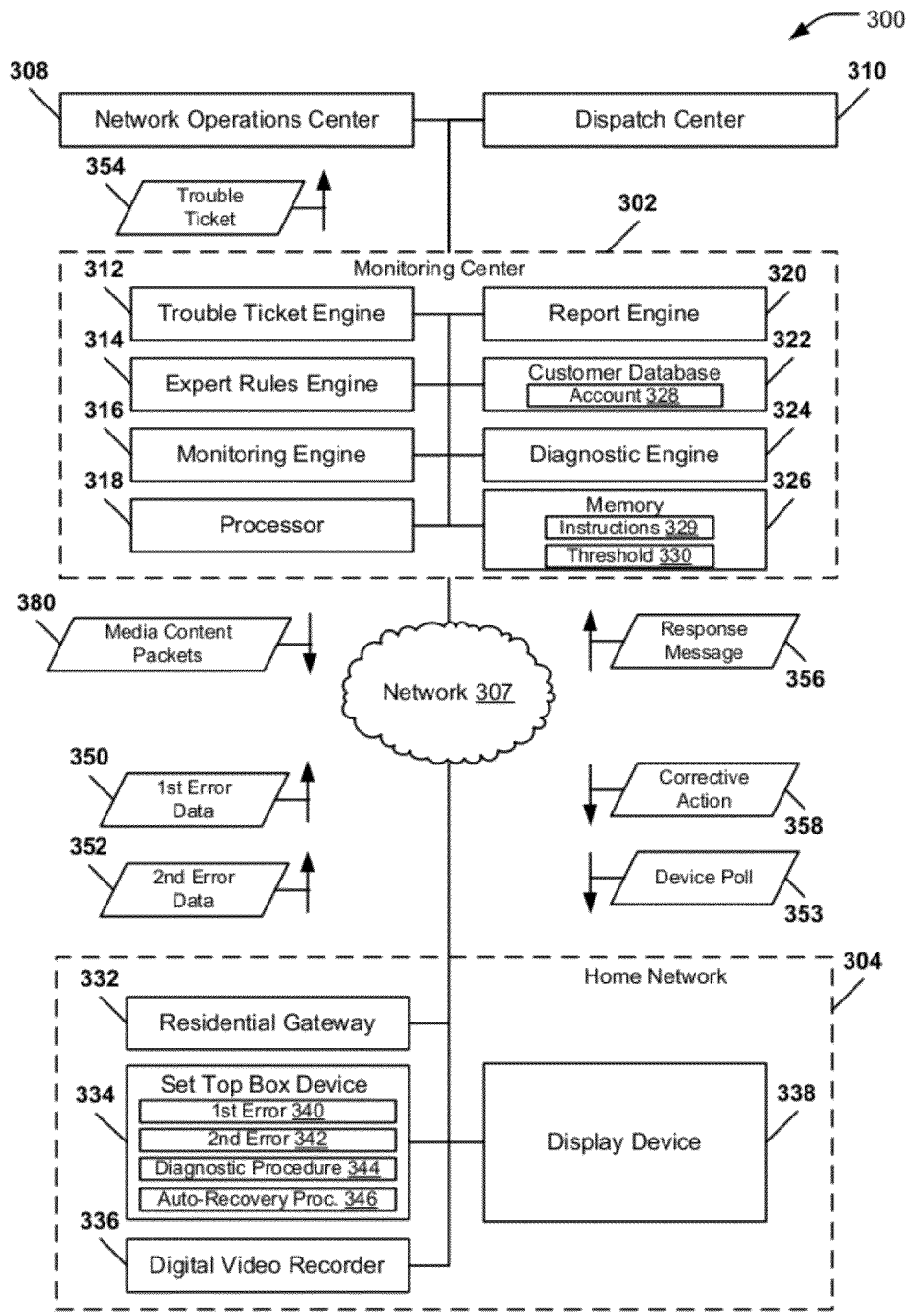
FIG. 3 is a block diagram of a third particular embodiment of a system to troubleshoot a set top box device.

Referring to FIG. 3, a block diagram of a third particular embodiment of a system to troubleshoot a set top box device is depicted and generally designated 300. The system 300 includes a home network 304 coupled to a monitoring center 302 via a network 307. A network operations center 308 and a dispatch center 310 are coupled to the monitoring center 302. The system 300 may be used to troubleshoot a device, such as a set top box device 334, in the home network 304.

The network 307 may be a private media content delivery network. The network 307 may be operable to distribute media content via media content packets 380 to one or more set top box devices, such as the set top box device 334. The media content may include television programs, movies, pay-per-view entertainment, audio content, video games, another type of media content, or any combination thereof. The network 307 may include a public switched telephone network (PSTN), a wireless network, an optical network, a data network, another type of network, or any combination thereof. In a particular embodiment, the network 307 may be an Internet Protocol Television (IPTV) network.

The network operations center 308 and the dispatch center 310 may be associated with the monitoring center 302. The network operations center 308 may be manned by network technicians that monitor the status of at least a portion of the network 307. The dispatch center 310 may receive instructions from the network operations center 308 to dispatch a technician to a particular location (e.g., the home network 304) to repair or replace equipment (e.g., the set top box device 334).

The monitoring center 302 may be an unmanned, fully automated hardware platform that executes software instructions to monitor customer premises equipment and to alter the network operations center 108 when a problem is detected or predicted. The monitoring center 302 includes a trouble ticket engine 312, an expert rules engine 314, a monitoring engine 316, a processor 318, a report engine 320, a customer database 322, a diagnostic engine 324, and a memory 326. The instructions 329 may be executable by the processor 318 to perform the various functions of the monitoring center 302, such as the monitoring engine 316, the expert rules engine 314, the trouble ticket engine 312, the report engine 320, and the diagnostic engine 324. The monitoring center 302 may be operable to monitor devices coupled to the network 307. For example, the monitoring engine 316 may monitor devices in the home network 304 that are coupled to the network 307.

When the monitoring engine 316 detects a problem with a particular device (e.g., the set top box device 334) that is coupled to the network 307, the monitoring engine 316 may instruct the diagnostic engine 324 to diagnose the problem. The diagnostic engine 324 may analyze the problem based on the expert rules engine 314. The expert rules engine 314 may include rules identifying root causes of problems and one or more solutions for solving the problems. The diagnostic engine 324 may correct the problem by automatically sending one or more messages to a particular device (e.g., the set top box device 334) to diagnose and resolve the problem with the particular device.

The diagnostic engine 324 may send a device poll message 354 to poll each of the devices in the home network 304. In response to receiving the device poll message 354, one or more of the devices in the home network 304 may send a response message 356 to the diagnostic engine 324. The diagnostics engine 324 may send a corrective action 358 based on the response message 356. For example, when the response message 356 indicates that the set top box device 334 is missing a decryption key, the corrective action 358 may include sending the decryption key to the set top box device 334. When the response message 356 indicates an unknown or unauthorized device is present in the home network 304, the diagnostic engine 324 may generate a trouble ticket 354 to notify the network operations center 308 that an unknown or unauthorized device is present. The diagnostic engine 324 may send the notification 360 to an address (e.g., an email or telephony device address) associated with the account 328, to notify a subscriber that an unknown or unauthorized device is present in the home network 304. When the diagnostic engine 324 does not receive a response from a particular device in the home network 304, the diagnostic engine 324 may send a corrective action 358 (e.g., an instruction to perform a power cycle) to the particular device. The diagnostic engine 324 may generate the trouble ticket 354 when the particular device does not respond to the device poll 353 or to the corrective action 358.

When the diagnostic engine 324 is unable to resolve the problem or when the diagnostic engine 324 determines that a device, such as the set top box device 334, is to be repaired or replaced, the diagnostic engine 324 may instruct the trouble ticket engine 312 to generate the trouble ticket 354. The network operations center 308 may receive the trouble ticket 354 and instruct the dispatch center 310 to dispatch a technician to repair or replace the set top box device 334.

The home network 304 may include multiple devices, such as a residential gateway 332, the set top box device 334, a digital video recorder 336, and a display device 338. The set top box device 334 may receive media content via media content packets 380 from the network 307. The set top box device 334 may decrypt and decode the media content from the media content packets 380 for display at the display device 338. In a particular embodiment, the digital video recorder 336 is a standalone device associated with the set top box device 334. In another particular embodiment, the digital video recorder 336 is integrated with the set top box device 334. The digital video recorder 336 may record the media content packets 380 received from the network 307.

In operation, the set top box device 334 may receive media content packets 380 via the network 307. The monitoring center 302 may receive first error data 350 indicating occurrence of a first error 340 occurring at a device in the home network 304, such as at the set top box device 334. The set top box device 334 may be associated with a customer account 328. The set top box device 334 may be at least partially functional after occurrence of the first error 340. The monitoring center 302 may receive second error data 352 indicating occurrence of a second error 342 at the set top box device 334. The set top box device 334 may be at least partially functional after the occurrence of the second error 342.

When an elapsed time between the occurrence of the first error 340 and the occurrence of the second error 342 satisfies a threshold 330, the monitoring center 302 may automatically generate a trouble ticket 354 to indicate a failure of the set top box device 334. The monitoring center 302 may automatically troubleshoot at least one of the first error 340 and the second error 342 after generating the trouble ticket 354. For example, the monitoring center 302 may send a corrective action 358 to one or more of the devices 332, 332, 336, and 338 in the home network 304. To illustrate, the corrective action 358 may cause one or more of devices 332, 332, 336, and 338 to automatically perform a power cycle to correct at least one of the errors 340 and 342.

The corrective action 358 may include instructing the set top box device 334 to perform a diagnostic procedure 344 or to perform an automatic recovery procedure 346. For example, the diagnostic procedure 344 may perform various internal tests and send the results (not shown) of the tests to the diagnostic engine 324 for further analysis. The automatic recovery procedure may include resetting at least some of the internal parameters of the set top box device 334 to default values, performing a power cycle, performing another recovery action, or any combination thereof.

The monitoring center 302 may determine how many of the devices 332, 332, 336, and 338 are associated with the customer account 328, poll the devices associated with the customer account 328 and determine which of the devices respond to the polling. For example, the diagnostic engine 324 may determine how many devices are in the home network 304 based on the account 328 in the customer database 322. The diagnostic engine 324 may send the device poll 353 to the devices 332, 332, 336, and 338 in the home network 304. One or more of the devices 332, 332, 336, and 338 in the home network 304 may send the response message 356 to the monitoring center 302 in response to receiving the device poll 353. In response to receiving the response message 356, the diagnostic engine 324 may determine the corrective action 358 using the expert rules engine 314 and send the corrective action 358 to one or more of the devices 332, 332, 336, and 338 in the home network 304.

Thus, the monitoring center 302 may monitor the devices 332, 334, 336, and 338 in the home network 304. The monitoring center 302 may receive the error data 350 and 352 from a device, such as the digital video recorder 336. The error data 350 and 352 may indicate a problem that has occurred at the device. The monitoring center 302 may perform various actions to correct the problem based on the error data 350 and 352. For example, the monitoring center 302 may automatically generate the trouble ticket 354 to instruct the network operations center 308 to dispatch a technician from the dispatch center 310 to repair or replace the device that sent the error data 350 and 352. The monitoring center 302 may automatically send the device poll 353 to one or more of the devices 332, 334, 336, and 338 in the home network 304. In response to the device poll 353, the monitoring center 302 may receive the response message 356 from one or more of the devices 332, 334, 336, and 338. Based on the response message 356, the monitoring center 302 may send the corrective action 358 to one or more of the devices 332, 334, 336, and 338. The corrective action 358 may automatically correct the errors 340 and 342 without any human interaction from a subscriber or from a service technician. For example, the corrective action 358 may cause one or more of the devices 332, 334, 336, and 338 to perform a power cycle. In this way, the monitoring center 302 may automatically identify and resolve a problem with one or more of the devices 332, 334, 336, and 338 and notify the subscriber of the resolution without the need for the subscriber to speak to a customer service representative of a service provider. This may result in greater customer satisfaction for subscriber because the monitoring center 302 may quickly resolve a particular problem without the subscriber having to take any action. The service provider may reduce costs by reducing a number of customer service representatives.

Figure 4:
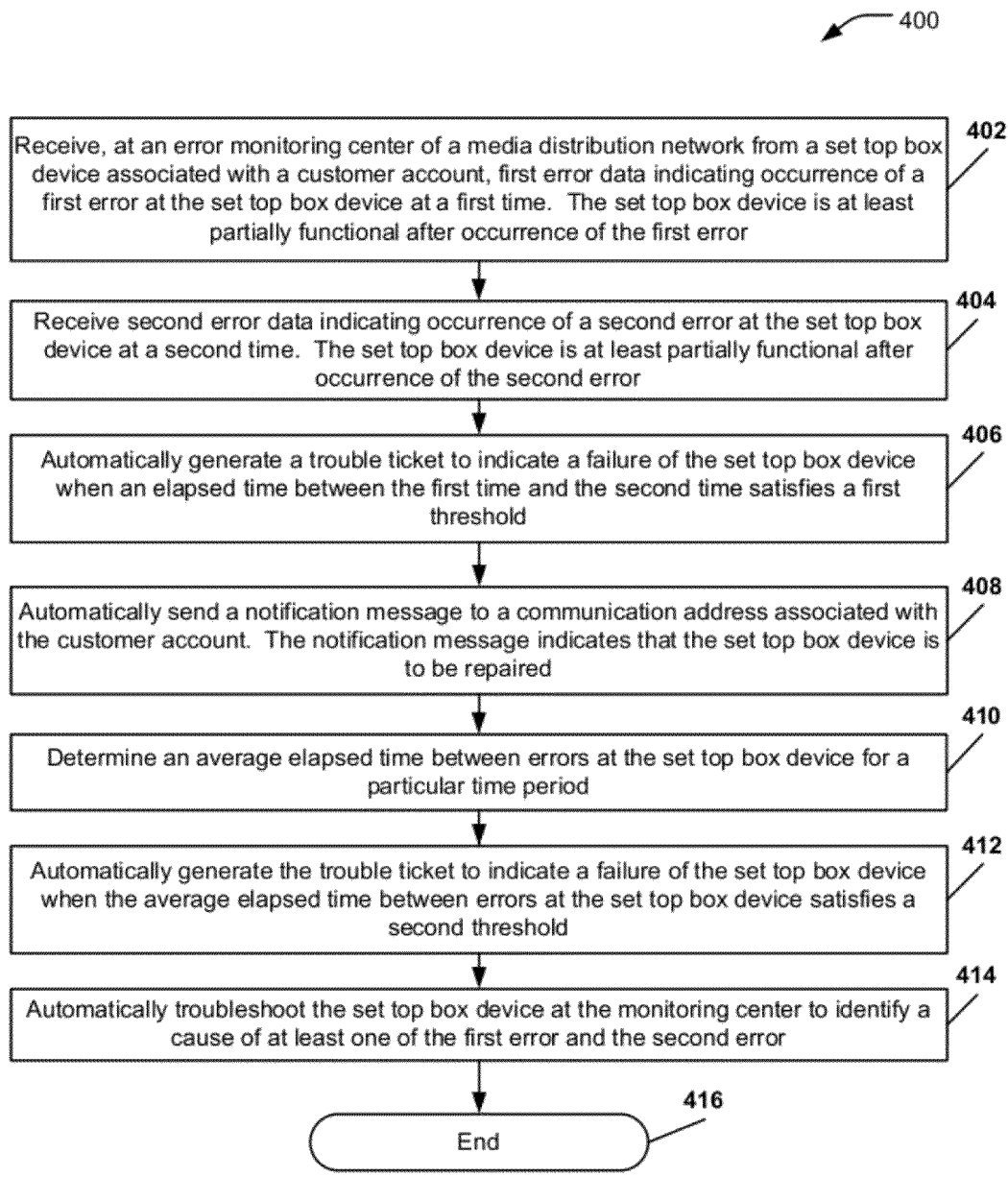
FIG. 4 is a flow diagram of a first particular embodiment of a method to troubleshoot a set top box device.

Referring to FIG. 4, a flow diagram of a first particular embodiment of method to troubleshoot a set top box device is depicted and generally designated 400. The method 400 may be performed by a monitoring center, such as the monitoring center 102 of FIG. 1, the monitoring center 202 of FIG. 2, or the monitoring center 303 of FIG. 3.

The method 400 begins when first error data indicating occurrence of an error at a first time at a set top box device is received, at 402. The set top box device may be associated with a customer account. The set top box device may be at least partially functional after occurrence of the first error. Moving to 404, second error data indicating occurrence of a second error at a second time at the set top box device is received at the monitoring center. Advancing to 406, a trouble ticket is automatically generated to indicate a failure of the set top box device when an elapsed time between the first time and the second time satisfies a first threshold. For example, in FIG. 1, the monitoring center 102 may receive the first error data 150 and the second error data 152. When an elapsed time between the occurrence of the first error 140 and the second error 142 satisfies the first threshold 130 the monitoring center 102 may generate the trouble ticket 154.

Proceeding to 408, a notification message may be automatically sent to a communication address associated with the customer account. The notification message may indicate that the set top box device is to be repaired. For example, in FIG. 1, the report engine 120 may send the notification message 160 to an address associated with the account 128 to indicate that the set top box device 134 is to be repaired. Moving to 410, an average elapsed time between errors of the set top box device may be determined for a particular time period. For example, an average elapsed time between errors of the set top box device may be determined for the past one week, two weeks, three weeks, one month, two months, three months, six months etc. Proceeding to 412, a trouble ticket may be automatically generated to indicate a failure of the set top box device when the average elapsed time between errors of the set top box device satisfies a second threshold. For example, the monitoring engine 116 may monitor errors, including the errors 140 and 142, occurring at the set top box device 134. When an average elapsed time between the errors 140 and 142 satisfies the second threshold 131 the trouble ticket engine 112 may automatically generate the trouble ticket 154 to indicate a failure of the set top box device 134.

Continuing to 414, the monitoring center may automatically troubleshoot the set top box device to identify a cause of at least one of the first error and the second error. For example, in FIG. 1, the monitoring center 102 may automatically troubleshoot the set top box device 134 to identify a cause of at least one of the first error 140 and the second error 142. For example, the diagnostic engine 124 may analyze the first error data 150 and the second error data 152 using the expert rules engine 114 to identify a root cause. The diagnostic engine 124 may perform the automatic recovery procedure 133 to correct at least one of the first error 140 and the second error 142. The method 400 ends at 416.

Thus, a monitoring center may monitor error data received from a device in a home network. The monitoring center may analyze the error data using expert rules to identify a root cause and perform one or more corrective actions. The monitoring center may issue a trouble ticket when the error data satisfies a particular threshold that indicates that the device is to be repaired. In this way, problems that occur with a device in the home network may be automatically resolved without the subscriber having to notify a customer service representative. In some cases, the monitoring center may perform one or more corrective actions to resolve the problem automatically, without dispatching a technician to solve the problem. Alternatively, a technician may be dispatched automatically in response to a trouble ticket that is automatically generated based on the error data. Thus, whether the monitoring center automatically takes corrective action to solve the problem or whether the monitoring center automatically dispatches technician, the customer does not have to call a customer service representative to have the problem fixed.

Figure 5:
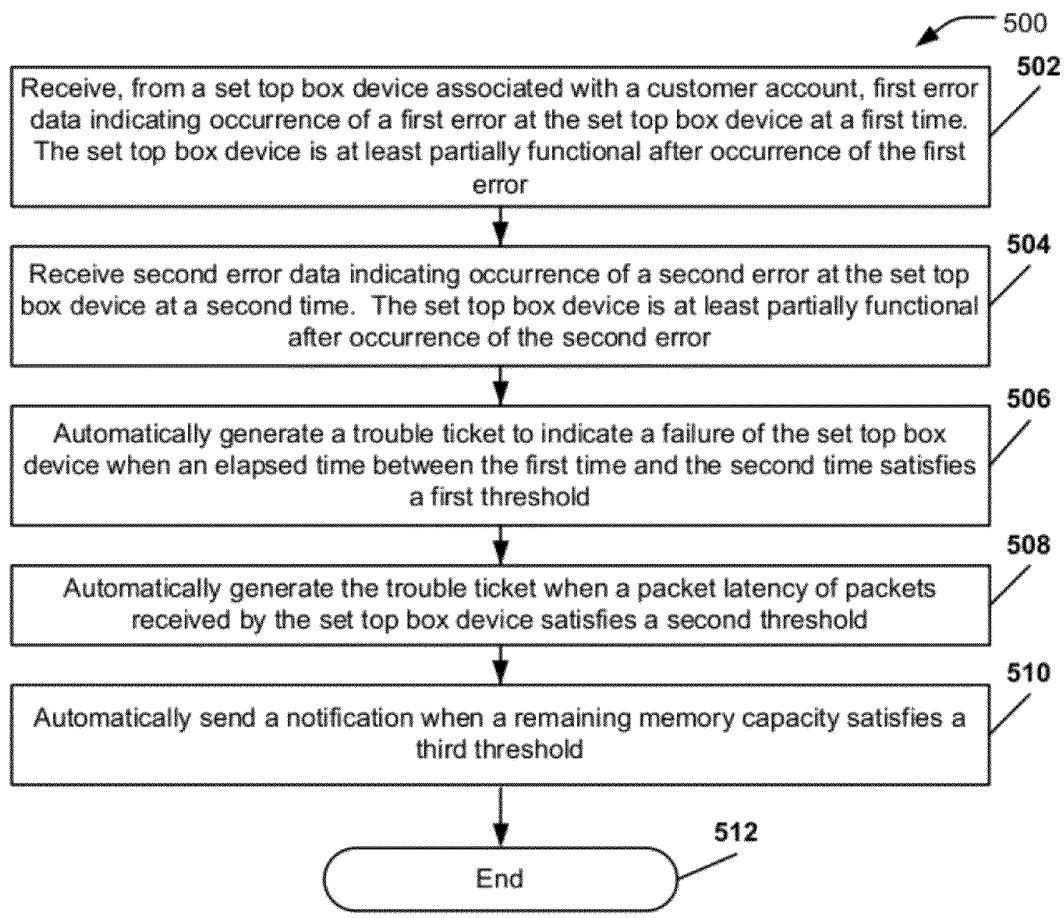
FIG. 5 is a flow diagram of a second particular embodiment of a method to troubleshoot a set top box device.

Referring to FIG. 5, a flow diagram of a second particular embodiment of a method to troubleshoot a set top box device is depicted and generally designated 500. The method 500 may be performed by a monitoring center, such as the monitoring center 102 of FIG. 1, the monitoring center 202 of FIG. 2, or the monitoring center 302 of FIG. 3.

The method 500 begins when first error data indicating occurrence of a first error at a set top box device at a first time is received from the set top box device. The set top box device may be associated with a customer account. The set top box device may be at least partially functional after occurrence of the first error. Moving to 504, second error data indicating occurrence of a second error at the set top box device at a second time may be received. The set top box device may be at least partially functional after occurrence of the second error. Continuing to 506, a trouble ticket may be automatically generated to indicate a failure of the set top box device when an elapsed time between the first time and the second time satisfies a first threshold. For example, in FIG. 2, the monitoring engine 216 may receive the first error data 250 and the second error data 252. The diagnostic engine 224 may analyze the first error data 250 and the second error data 252 using the expert rules engine 214. The diagnostic engine 224 may instruct the trouble ticket engine 212 to generate the trouble ticket 254 to indicate a failure of the set top box device 234.

Advancing to 508, the trouble ticket may be automatically generated when a packet latency of packets received by the set top box device satisfies a second threshold. For example, in FIG. 2, the trouble ticket 254 may be generated based on the packet latency 251. Advancing to 510, a notification message may be automatically sent when a remaining memory capacity satisfies a third threshold. For example, in FIG. 2, the monitoring center 202 may send the notification 260 to one or more of the devices to an address associated with the account 228 when the remaining capacity 272 satisfies the third threshold 233. The method 500 ends at 512.

Thus, a monitoring center may monitor error data received from a device in a home network. The monitoring center may analyze the error data using expert rules to identify a root cause and perform one or more corrective actions. The monitoring center may issue a trouble ticket when the error data satisfies a particular threshold that indicates that the device is to be repaired. In this way, problems that occur with a device in the home network may be automatically resolved without the subscriber having to notify a customer service representative. In some cases, the monitoring center may perform one or more corrective actions to resolve the problem automatically, without dispatching a technician to solve the problem. For example, in FIG. 2, the monitoring center 202 may send the corrective action 258 to the digital video recorder 236 to increase the remaining capacity 272 of the memory 270. Alternatively, a technician may be dispatched automatically in response to a trouble ticket that is automatically generated based on the error data. Thus, whether the monitoring center automatically takes corrective action to solve the problem or whether the monitoring center automatically dispatches technician, the customer does not have to call a customer service representative to have the problem fixed.

Figure 6:
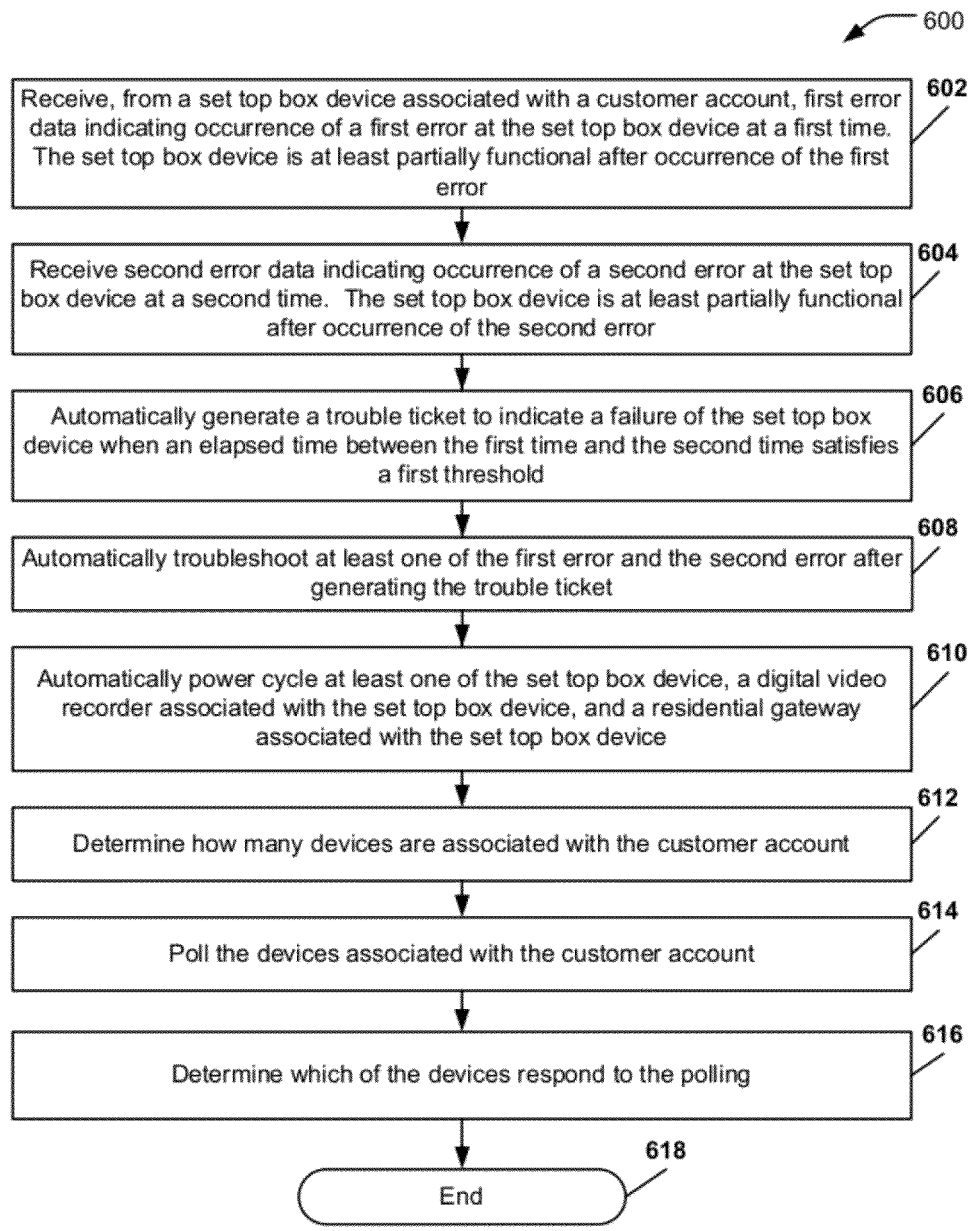
FIG. 6 is a flow diagram of a third particular embodiment of a method to troubleshoot a set top box device.

Referring to FIG. 6, a flow diagram of a third particular embodiment of a method to troubleshoot a set top box device is depicted and generally designated 600. The method 600 may be performed by a monitoring center, such as the monitoring center 102 of FIG. 1, the monitoring center 202 of FIG. 2, or the monitoring center 302 of FIG. 3.

The method 600 begins when first error data indicating occurrence of a first error at a set top box device at a first time is received from the set top box device. The set top box device is associated with a customer account. The set top box device is at least partially functional after occurrence of the first error. Moving to 604, second error data indicating occurrence of a second error at the set top box device at a second time is received. The set top box device is at least partially functional after occurrence of the second error. Continuing to 606, a trouble ticket is automatically generated to indicate a failure of the set top box device when an elapsed time between the first time and the second time satisfies a first threshold. For example, in FIG. 3, the monitoring center 302 may generate the trouble ticket 354 when the elapsed time between the occurrence of the first error 340 and the second error 342 satisfies the threshold 330.

Advancing to 608, the monitoring center may automatically troubleshoot at least one of the first error and the second error after generating the trouble ticket. Proceeding to 610, the monitoring center may automatically power cycle at least one of the set top box device, a digital video recorder associated with the set top box device, and a residential gateway associated with the set top box device. For example, in FIG. 3, the monitoring center 302 may send the corrective action 358 to one or more of the devices in the home network 304. The corrective action 358 may cause at least one of the set top box device 334, the digital video recorder 334, the residential gateway 332, and the display device 338 to automatically perform a power cycle.

Continuing to 612, a determination may be made as to how many devices are associated with the customer account. Proceeding to 614, the devices associated with the customer account may be polled. Continuing to 616, the devices that responded to the polling may be determined. For example, in FIG. 3, the diagnostic engine 324 may send the device poll 353 to one or more of the residential gateway 332, the set top box device 334, the digital video recorder 336, and the display device 338. The monitoring center 302 may receive one or more responses, such as the response message 356, from one or more of the devices in the home network 304. The monitoring center 302 may send the corrective action 358 to one or more of the devices 332, 334, 336, and 338 based on the response message 356. The method 600 then ends at 618.

Thus, a monitoring center may monitor error data received from a device in a home network. The monitoring center may analyze the error data using expert rules to identify a root cause. The monitoring center may poll the devices in the home network to obtain additional information. The monitoring center may perform one or more corrective actions based on the root cause and the additional information. The monitoring center may issue a trouble ticket when the error data satisfies a particular threshold that indicates that the device is to be repaired. In this way, problems that occur with a device in the home network may be automatically resolved without the subscriber having to notify a customer service representative. In some cases, the monitoring center may perform one or more corrective actions to resolve the problem automatically, without dispatching a technician to solve the problem. For example, in FIG. 3, the monitoring center 302 may send the corrective action 358 to the set top box device 334 to power cycle the set top box device 334. Alternatively, a technician may be dispatched automatically in response to a trouble ticket that is automatically generated based on the error data. Thus, the customer does not have to call a customer service representative to have the problem fixed whether the monitoring center automatically takes corrective action to solve the problem or whether the monitoring center automatically dispatches technician.

Figure 7:
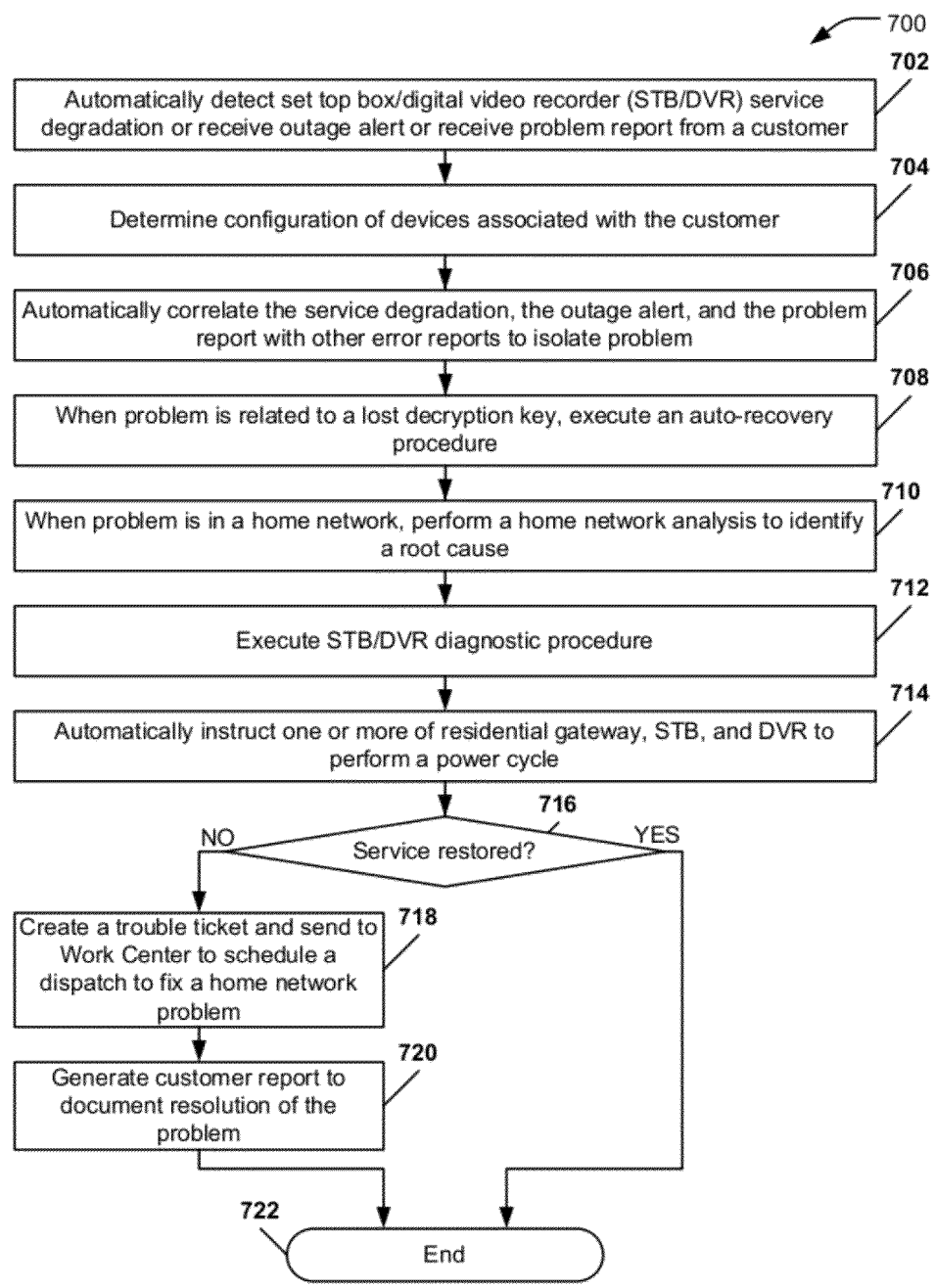
FIG. 7 is a flow diagram of a fourth particular embodiment of a method to troubleshoot a set top box device.

Referring to FIG. 7, a flow diagram of a fourth particular embodiment of a method to troubleshoot a set top box device is depicted and generally designated 700. The method 700 may be performed by a monitoring center, such as the monitoring center 102 of FIG. 1, the monitoring center 202 of FIG. 2, or the monitoring center 302 of FIG. 3.

The method 700 begins when set top box device or digital video recorder service degradation is automatically detected, when an outage alert is received, or when a problem report is received from a customer. For example, in FIG. 1, the monitoring center 102 may automatically detect a service degradation at the set top box device 134 or the digital video recorder 136. The monitoring center 102 may receive an outage alert from the network operations center 108. The network operations center 108 may receive a problem report from a customer and forward the problem report to the monitoring center 102 for resolution.

Moving to 704, a configuration of devices associated with the customer is determined. For example, in FIG. 1 the monitoring center 102 may access the account 128 associated with the home network 104 and identify which devices are associated with the customer. Advancing to 706, the service degradation, the outage alert, and the problem report may be automatically correlated with other error reports to isolate the problem. For example, in FIG. 1, the diagnostic engine 124 may automatically correlate the service degradation, the outage alert, and the problem alert to determine a root cause of the problem. Advancing to 708, when the problem is related to a lost decryption key, an automatic recovery procedure may be executed. For example, in FIG. 1, the diagnostic engine 124 may execute the automatic recovery procedure 133 to retrieve the decryption key 167 and send the decryption key 167 to a set top box device 134.

Advancing to 710, when the problem is determined to be in a home network, a home network analysis may be performed to identify a root cause of the problem. For example, in FIG. 3, the monitoring center 302 may poll each device in the home network 304 by sending the device poll 353 and analyze the response message 356 that is received in response to the device poll 353. Moving to 712, a set top box device diagnostic procedure may be executed. For example, in FIG. 3, the set top box device 334 may be instructed to perform the diagnostic procedure 344.

Moving to 714, the monitoring center may instruct one or more of a residential gateway, set top box device or the digital video recorder to power cycle. For example, in FIG. 2, the monitoring center 302 may send a corrective action 358 that causes a device, such as the set top box device 334 or the digital video recorder 336, to perform a power cycle. Advancing to 716, a determination is made whether service is restored after performing the power cycle. When a determination is made that service is restored at 716, the method 700 ends. When a determination is made that service is not restored at 716, a trouble ticket is created and sent to a work center to schedule a dispatch to fix a home network problem, at 718. For example, in FIG. 3, the monitoring center 302 may generate the trouble ticket 354 when the corrective action 358 does not restore service to the device, such as the set top box device 334 or the digital video recorder 336. A customer report may be generated to document the resolution, at 720, and the method 700 ends at 722. For example, in FIG. 1, the monitoring center 102 may generate the notification message 160 to document the resolution of the problem and send the notification message 160 to an address associated with the account 128.

Thus, a monitoring center may automatically detect a service degradation at a set top box device or a digital video recorder. The monitoring center may perform one or more corrective actions in response to detecting the service degradation. The monitoring center may issue a trouble ticket when error data indicates that the set top box device or the digital video recorder is to be repaired. In this way, problems that occur at a device in the home network may be automatically resolved without the subscriber having to notify a customer service representative. In some cases, the monitoring center may perform one or more corrective actions to resolve the problem automatically, without dispatching a technician to solve the problem. Alternatively, a technician may be dispatched automatically in response to a trouble ticket that is automatically generated based on the error data. Thus, the customer may not have to call a customer service representative to have the problem fixed whether the monitoring center automatically takes corrective action to solve the problem or whether the monitoring center automatically dispatches a technician to solve the problem.

Figure 8:
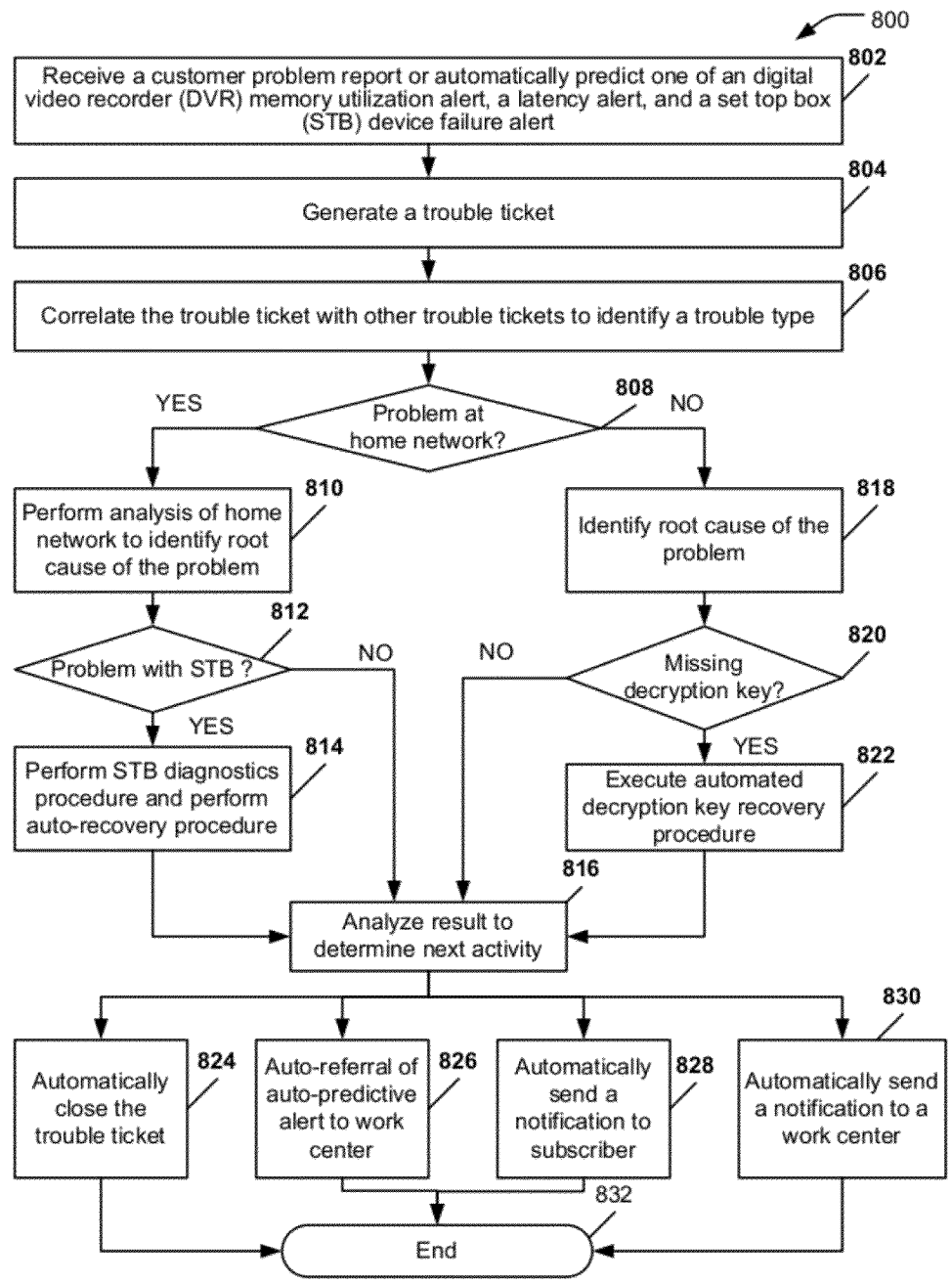
FIG. 8 is a flow diagram of a fifth particular embodiment of a method to troubleshoot a set top box device.

Referring to FIG. 8, a flow diagram of a fifth particular embodiment of a method to troubleshoot a set top box device is depicted and generally designated 800. The method 800 may be performed by a monitoring center such as the monitoring center 102 of FIG. 1, the monitoring center 202 of FIG. 2, or the monitoring center 302 of FIG. 3.

The method 800 begins when a customer problem report is received or one of a digital video recorder memory utilization alert, a latency alert, and a set top box device failure alert is automatically predicted, at 802. For example in FIG. 2, the monitoring center 202 may automatically predict a memory utilization problem, a latency problem, or a set top box device failure based on the first error data 250 and the second error data 252. Moving to 804, a trouble ticket is generated. Advancing to 806, the trouble ticket may be correlated with other trouble tickets to identify a trouble type. For example, in FIG. 2, the trouble ticket engine 212 may generate the trouble ticket 254 and the diagnostic engine 224 may correlate the trouble ticket 254 with other trouble tickets (not shown) that are stored at the trouble ticket engine 212 using the expert rules engine 214.

Proceeding to 808, a determination may be made whether the trouble is related to a home network problem. When the problem is determined to be related to the home network, at 808, then a home network analysis may be performed to identify a root cause of the problem, at 810. For example, in FIG. 3, the device poll 353 may be sent to poll the devices 332, 334, 336, and 338 in the home network 304. The response message 356 that results from sending the device poll 353 may be analyzed to identify a root cause of the problem. Advancing to 812, a determination may be made whether the problem is related to the set top box device. For example, a rule to determine whether a set top box device is defective may be when two crash events occur within D days or when an average time between crashes is less than H hours. Mathematically, this may be represented by the equation $((T_i - T_{i-1}) < D)$ OR $(Avg(Sum(T_i - T_{i-1}$ for $i = 1 \ldots n) < H$ where $T_{i-1}$ represents a timestamp of a first crash of a set top box device and $T_i$ represents a timestamp of a subsequent crash of the set top box device. When the problem is related to the set top box device, at 812, the set top box device diagnostic procedure is executed and an automatic recovery procedure is executed at, 814 and the method proceeds to 816. For example, in FIG. 3, the set top box device 334 may be instructed to perform the diagnostic procedure 344 and to perform the automatic recovery procedure 346. When the problem is not related to the set top box device, at 812, the method proceeds to 816.

When a determination is made that the problem is at the home network, at 808, an analysis of the home network may be performed to identify a root cause of the problem, at 810. For example, in FIG. 3, the device poll 353 may poll one or more of the devices 332, 334, 336, and 338 in the home network 304. Continuing to 812, a determination may be made whether the set top box device has a problem, at 812. When the set top box device is determined to not have a problem, at 810, the method proceeds to 816. When the set top box device is determined to have a problem, at 810, a set top box device diagnostic routine and an automatic recovery procedure may be performed, at 814. For example, in FIG. 13, the set top box device 334 may perform the diagnostic procedure 344 and the automatic recovery procedure 346. The method 800 proceeds to 816.

When a determination is made that the problem is not at the home network, at 808, a root cause of the problem may be identified, at 818. Continuing to 820, a determination may be made whether a decryption key is missing, at 820. When the decryption key is determined to be not missing at 820, the method proceeds to 816. When the decryption key is determined to be missing at 820, an automated decryption key recovery procedure may be executed, at 822. For example, in FIG. 1, the automatic recovery procedure 133 may be performed to recover the decryption key 167 and send the decryption key 167 to the set top box device 134 and the method proceeds to 816.

Advancing to 816, the results of performing the previous activity are analyzed to determine a next activity to perform. For example, the result of performing the set top box device diagnostics procedure and the automatic recovery procedure, at 814, may be analyzed to determine the next activity. The results of performing the encrypted key recovery, at 822, may be analyzed to determine the next activity. The next activity may include one or more of automatically closing the trouble ticket, at 824, automatically referring the automatically predicted alert to a work center, at 826, automatically sending a notification to a subscriber, at 828, and automatically sending a notification to a work center at 830. The method 800 ends at 832.

Thus, a monitoring center may automatically predict a digital video recorder memory utilization problem, a latency problem, or a set top box device failure problem. The monitoring center may perform one or more corrective actions in response to detecting the problem. The monitoring center may issue a trouble ticket when the problem is such that the set top box device or the digital video recorder is to be repaired. In this way, problems that occur at a device in the home network may be automatically resolved without the subscriber calling a customer service representative.

Figure 9:
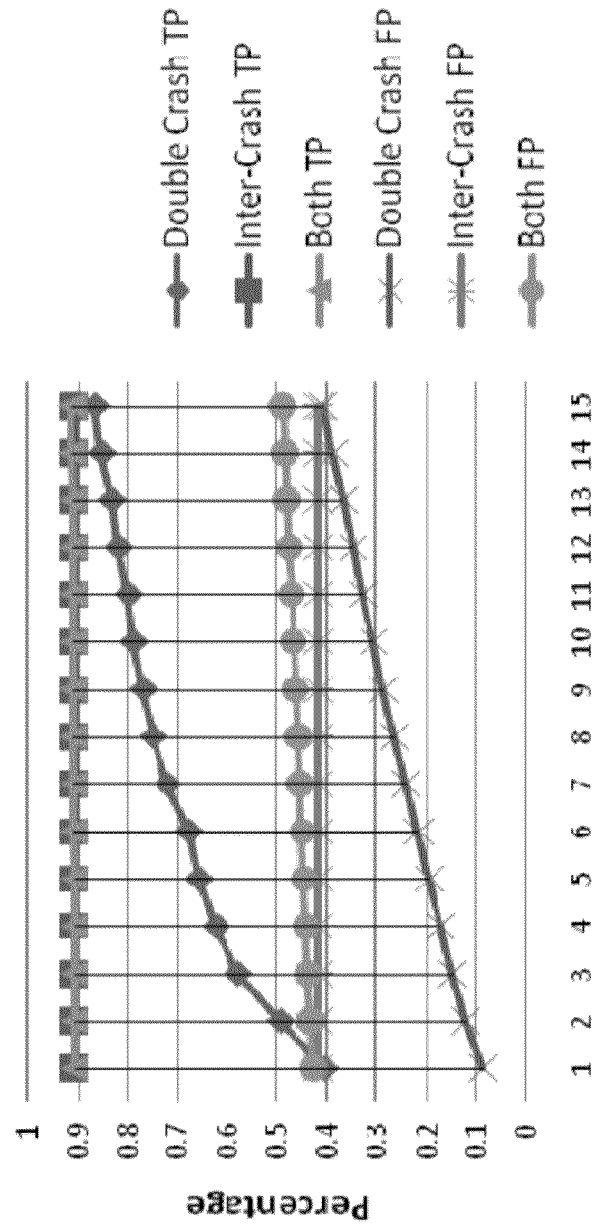
FIG. 9 is a first graphical diagram of set top box device failures.

Referring to FIG. 9, a first graphical diagram of set top box device failures is depicted and generally designated 900. The first graphical diagram 900 shows how a double crash within a short period of time may be indicative of a problem with a set top box/digital video recorder based on an eligible population of set top box devices.

When two crash events occur at a set top box device within a predetermined period of time (e.g., three days), a monitoring center (e.g., the monitoring center 102 of FIG. 1, the monitoring center 202 of FIG. 2, and the monitoring center of FIG. 3) may automatically determine that the set top box device has failed. The monitoring center may generate a trouble ticket to dispatch a technician to repair or replace the set top box device. When two or more crash events occur at the set top box device and the average time between crash events is less than a predetermined period of time (e.g., eight hours), the monitoring center may automatically determine that the set top box device has failed and generate a trouble ticket to dispatch a technician to repair or replace the set top box device.

FIG. 9 shows true positive (TP) and false positive (FP) rates for the eligible population of set top box devices. The eligible population may be any set top box device for which there were at least two crashes in the fourteen weeks prior to the set top box device being replaced. The TP rate is determined by the percentage of failed set top box devices which were identified as failed (i.e., crashed) while the FP rate is determined by the percentage of set top box devices without any problems that were identified as failed. The double crash rates (i.e., two crashes within a particular time period) vary by the number of days in which a double crash may have occurred. The x-axis (values 1 to 15) corresponds to the number of days (parameter D) for a double crash test. Although the double crash TP is initially much lower at 40.6%, this increases as the time in which a double crash can occur increases, until a maximum of 86.7% TP rate. Correspondingly the FP rate increases with the TP rate, offering a tradeoff in performance.

Thus, one or more of the elapsed time between two crash events and the average time between multiple crash events may be indicators that a set top box device should be repaired or replaced. When the elapsed time between two crash events satisfies a first threshold the monitoring center may automatically determine that the set top box device has failed and generate a trouble ticket. When the average time between multiple crash events satisfies a second threshold the monitoring center may automatically determine that the set top box device has failed and generate a trouble ticket. Thus, the trouble ticket may be generated without a subscriber calling a customer service representative.

Figure 10:
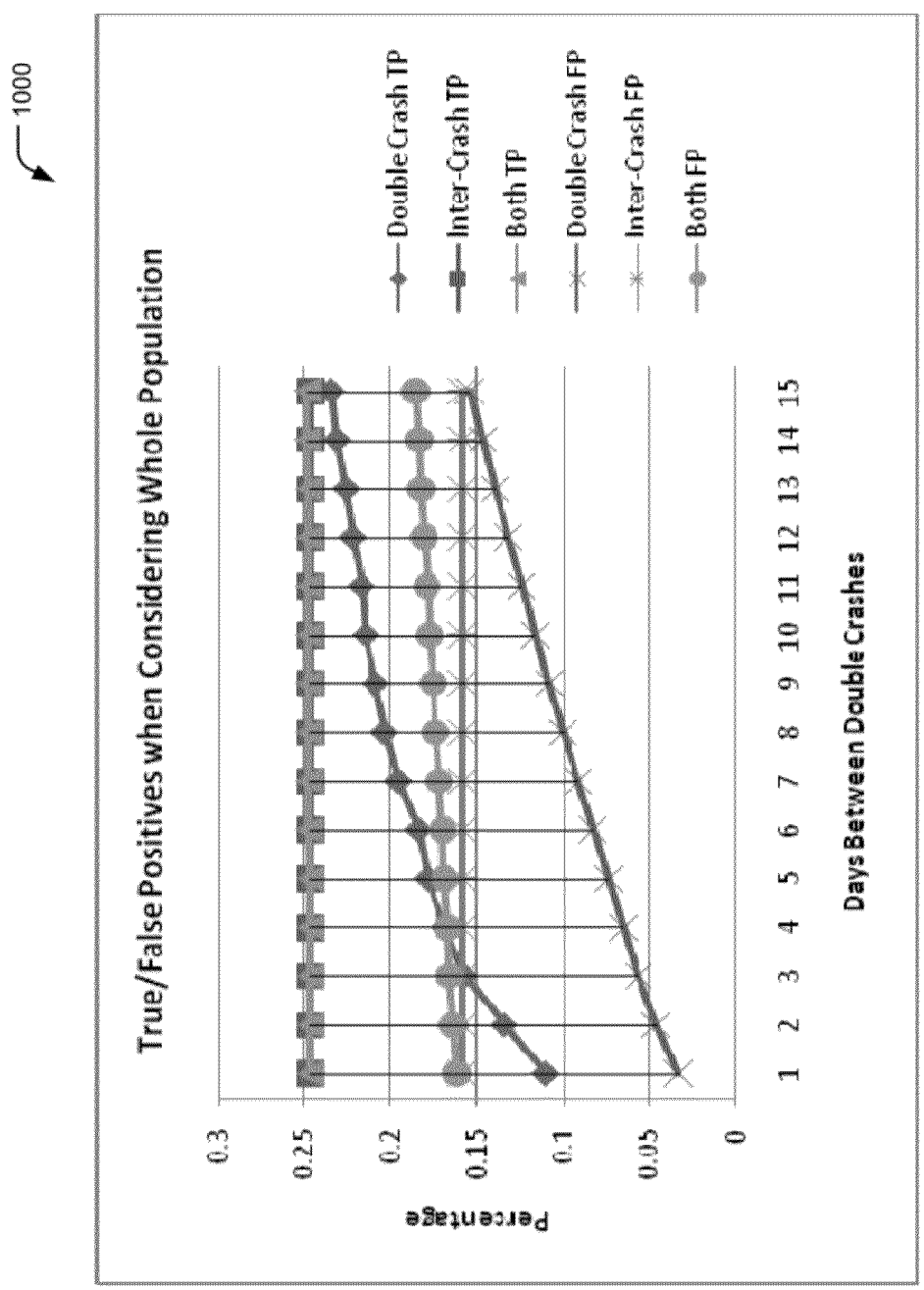
FIG. 10 is a second graphical diagram of set top box device failures.

Referring to FIG. 10, a second graphical diagram of set top box device failures is depicted and generally designated 1000. The second graphical diagram 1000 shows how a double crash within a short period of time may be indicative of a problem with a set top box/digital video recorder based on an entire population of set top box devices.

FIG. 10 presents the same information as FIG. 9, but over an entire population of set top box devices associated with a service provider. The set top box devices that are included in FIG. 10 that are not included in FIG. 9 are those set top box devices that did not have two or more crashes. The set top box devices not included constitute the majority of set top box devices associated with a service provider in both the TP and FP rates, in particular 73% of the failed population and 62% of the sample from the whole population of crash events.

When two crash events occur at a set top box device within a predetermined period of time (e.g., three days), a monitoring center (e.g., the monitoring center 102 of FIG. 1, the monitoring center 202 of FIG. 2, and the monitoring center of FIG. 3) may automatically determine that the set top box device has failed. The monitoring center may generate a trouble ticket to dispatch a technician to repair or replace the set top box device. When two or more crash events occur at the set top box device and the average time between crash events is less than a predetermined period of time (e.g., eight hours), the monitoring center may automatically determine that the set top box device has failed and generate a trouble ticket to dispatch a technician to repair or replace the set top box device.

Thus, both the elapsed time between two crash events and the average time between multiple crash events may be indicators that a set top box device should be repaired or replaced. When the elapsed time between two crash events satisfies a first threshold the monitoring center may automatically determine that the set top box device has failed and generate a trouble ticket. When the average time between multiple crash events satisfies a second threshold the monitoring center may automatically determine that the set top box device has failed and generate a trouble ticket. Thus, the trouble ticket may be generated without a subscriber calling a customer service representative.

Figure 11:
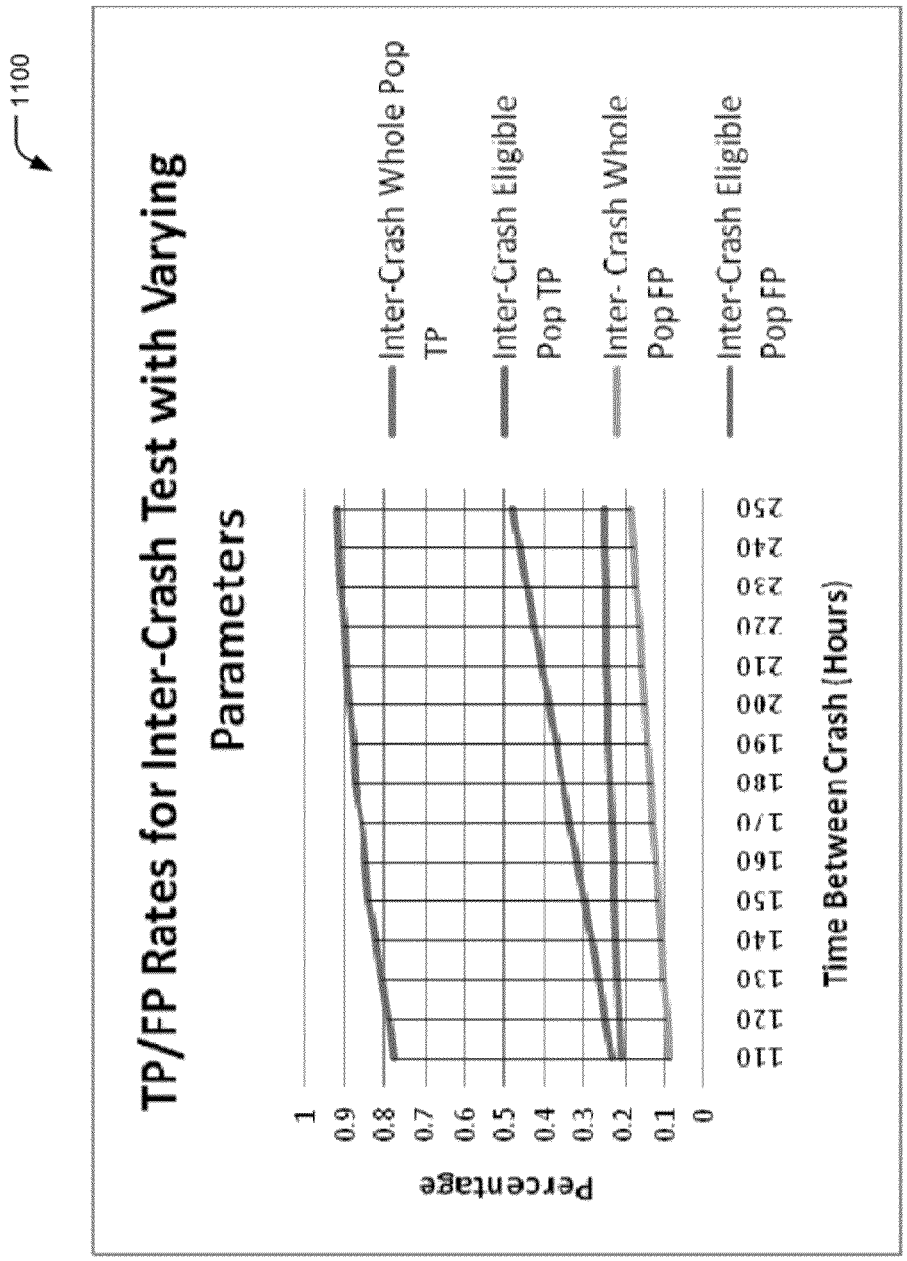
FIG. 11 is a third graphical diagram of set top box device failures.

Referring to FIG. 11, a third graphical diagram of set top box device failures is depicted and generally designated 1100. The third graphical diagram 1100 shows how a double crash within a short period of time may be indicative of a problem with a set top box/digital video recorder.

FIG. 11 represents the result of varying a threshold parameter, H (hours), for the inter-crash rule. FIG. 11 again illustrates a trade-off between the TP and the FP rates. The parameters for both the time interval for a double crash as well as the average inter-crash time can be varied to increase or decrease the TP and the FP rates respectively. The TP rate may affect the number of failed set top box devices that are correctly identified as failed while the FP rate may affect the number of set top box devices that are incorrectly identified as failed.

When two crash events occur at a set top box device within a predetermined period of time (e.g., three days), a monitoring center (e.g., the monitoring center 102 of FIG. 1, the monitoring center 202 of FIG. 2, and the monitoring center of FIG. 3) may automatically determine that the set top box device has failed. The monitoring center may generate a trouble ticket to dispatch a technician to repair or replace the set top box device. When two or more crash events occur at the set top box device and the average time between crash events is less than a predetermined period of time (e.g., eight hours), the monitoring center may automatically determine that the set top box device has failed and generate a trouble ticket to dispatch a technician to repair or replace the set top box device.

Thus, both the elapsed time between two crash events and the average time between multiple crash events may be indicators that a set top box device should be repaired or replaced. When the elapsed time between two crash events satisfies a first threshold the monitoring center may automatically determine that the set top box device has failed and generate a trouble ticket. When the average time between multiple crash events satisfies a second threshold the monitoring center may automatically determine that the set top box device has failed and generate a trouble ticket. Thus, the trouble ticket may be generated without a subscriber calling a customer service representative.

Figure 12:
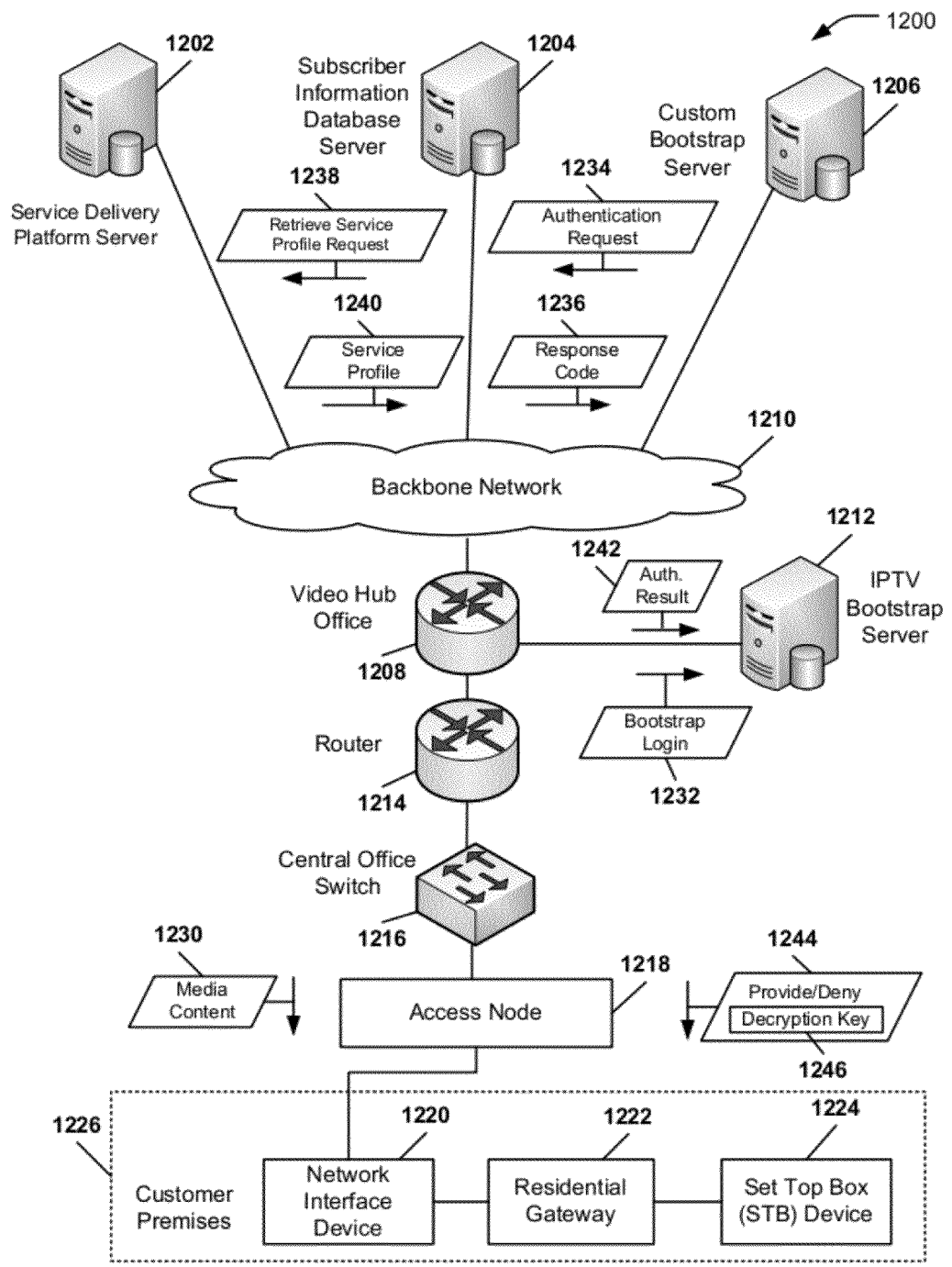
FIG. 12 is a block diagram of a fourth particular embodiment of a system to troubleshoot a set top box device.

Referring to FIG. 12, a block diagram of a fourth particular embodiment of system to troubleshoot a set top box device. The system 1200 includes a service delivery platform (SDP) server 1202, a subscriber information database server 1204, a custom bootstrap server 1206, and video hub office 1208 coupled to a backbone network 1210. The system 1200 may be operable to troubleshoot a set top box device 1224. For example, the system 1200 may automatically recover a lost decryption key for the set top box device 1224.

A bootstrap server 1212 and a router 1214 are coupled to the video hub office 1208. A central office switch 1216 is coupled to the router 1214. An access node 1218 is coupled to the central office switch 1216. A network interface device 1220 is located at each customer premises, such as the customer premises 1226. The network interface device 1220 is coupled to the access node 1218. A residential gateway 1222 is coupled to the network interface device 1220. The set top box device 1224 is coupled to the residential gateway 1222. In a particular embodiment, the set top box device 1224 includes an integrated digital video recorder. The network interface device 1220, the residential gateway 1222, and the set top box device 1224 may be located at the customer premises 1226.

The backbone network 1210 may be a private media content delivery network. The backbone network 1210 may be operable to distribute media content 1230 to one or more set top box devices, such as the set top box device 1224. The media content 1230 may include television programs, movies, pay-per-view entertainment, audio content, video games, another type of media content, or any combination thereof. The backbone network 1210 may include a public switched telephone network (PSTN), a wireless network, an optical network, a data network, another type of network, or any combination thereof. In a particular embodiment, the backbone network 1210 may be an Internet Protocol Television (IPTV) network.

The service delivery platform server 1202 may provide the media content 1230 to subscribers via the backbone network 1210. For example, the service delivery platform server 1202 may enable a service provider to encode the various types of programming to a particular standard, such as H.264. The service delivery platform server 1202 may enable a service provider to encrypt the various type of programming using a digital rights management scheme. The service delivery platform server 1202 may store data associated with each set top box device that is serviced by the service delivery platform server 1202.

The subscriber information database server 1204 may include information associated with each subscriber, such as account information, how many devices are associated with the account, a physical address of the account, contact information associated with the subscriber (e.g., email address and phone number), other subscriber-related information, or any combination thereof.

The IPTV bootstrap server 1212 and the custom bootstrap server 1206 may authenticate one or more set top box devices, such as the set top box device 1224, and send the set top box devices a decryption key associated with the digital rights management scheme used by the service delivery platform server 1202 to enable the set top box devices to decrypt the media content 1230 for display at a display device. The IPTV bootstrap server 1212 may be a generic bootstrap server provided by an IPTV equipment provider. The custom bootstrap server 1206 may be specific to a particular service provider.

The video hub office 1208 may distribute the media content 1230 sent from the service delivery platform 1202 to routers, such as the router 1214, for routing to one or more set top box devices. The router 1214 may route the media content sent from the service delivery platform 1202 to one or more central office switches, such as the central office switch 1216, for delivery to one or more set top box devices. The access node 1218 may connect the customer premises 1226 to the core network (i.e., the video hub office 1208, the router 1214, and the central office switch 1216) to provide telephony services, internet services, and media content services to subscribers.

In operation, the set top box device 1224 may send a bootstrap login message 1232 to the IPTV bootstrap server 1212. The IPTV bootstrap server 1212 may send the bootstrap login message 1232 to the custom bootstrap server 1206. The custom bootstrap server 1206 may authenticate the set top box device 1224 by sending an authentication request 1234 to the subscriber information database server 1204. After receiving the authentication request 1234, the subscriber information database server 1204 may authenticate the set top box device 1224 and send a response code 1236 to the custom bootstrap server 1206. Based on the response code 1236, the custom bootstrap server 1206 may send a retrieve service profile request 1238 to the service delivery platform server 1202. In response to receiving the retrieve service profile request 1238, the service delivery platform server 1202 may send a service profile 1240 associated with the set top box device 1224 to the custom bootstrap server 1206. In response to receiving the service profile 1240 from the service delivery platform server 1202, the custom bootstrap server 1206 may send an authentication result message 1242 to the IPTV bootstrap server 1212. In response to receiving the authentication result message 1242, the IPTV bootstrap server 1212 may send a provide/deny message 1244 to the set top box device 1224. When the set top box device 1224 has been authenticated, the provide/deny message 1244 may include a decryption key 1246 to enable the set top box device 1224 to decrypt the media content 1230 that is received from the service delivery platform server 1202. When the set top box device 1224 has not been authenticated, the provide/deny message 1244 may indicate that the set top box device 1224 is not authorized to display the media content 1230.

Thus, when the set top box device 1224 encounters an error (e.g., a system crash or memory corruption) that results in the loss of the decryption key 1246, the set top box device 1224 may be authenticated using the service delivery platform server 1202, the subscriber information database server 1204, the custom bootstrap server 1206, and the IPTV bootstrap server 1212. When the set top box device 1224 is authenticated, the decryption key 1246 may be automatically retrieved from the service delivery platform server 1202 and sent to the set top box device 1224. The decryption key 1246 may be retrieved and sent to the set top box device 1224 without a subscriber associated with the set top box device 1224 calling a customer service representative to retrieve the decryption key 1246, thereby increasing customer satisfaction.

FIGS. 13, 14, 15, and 16 represent an example of an automatic diagnostic procedure to troubleshoot a set top box device. The method of FIGS. 13, 14, 15 and 16 may be performed by a monitoring center, such as the monitoring center 102 of FIG. 1, monitoring center 202 of FIG. 2, or the monitoring center 302 of FIG. 3. The method may set a recovery reason and an indicator that is displayed by the device. For example, a set top box device may have one or more light emitting diodes to display various indicators, such as red, green, and yellow, to indicate a status of the set top box device.

Figure 13:
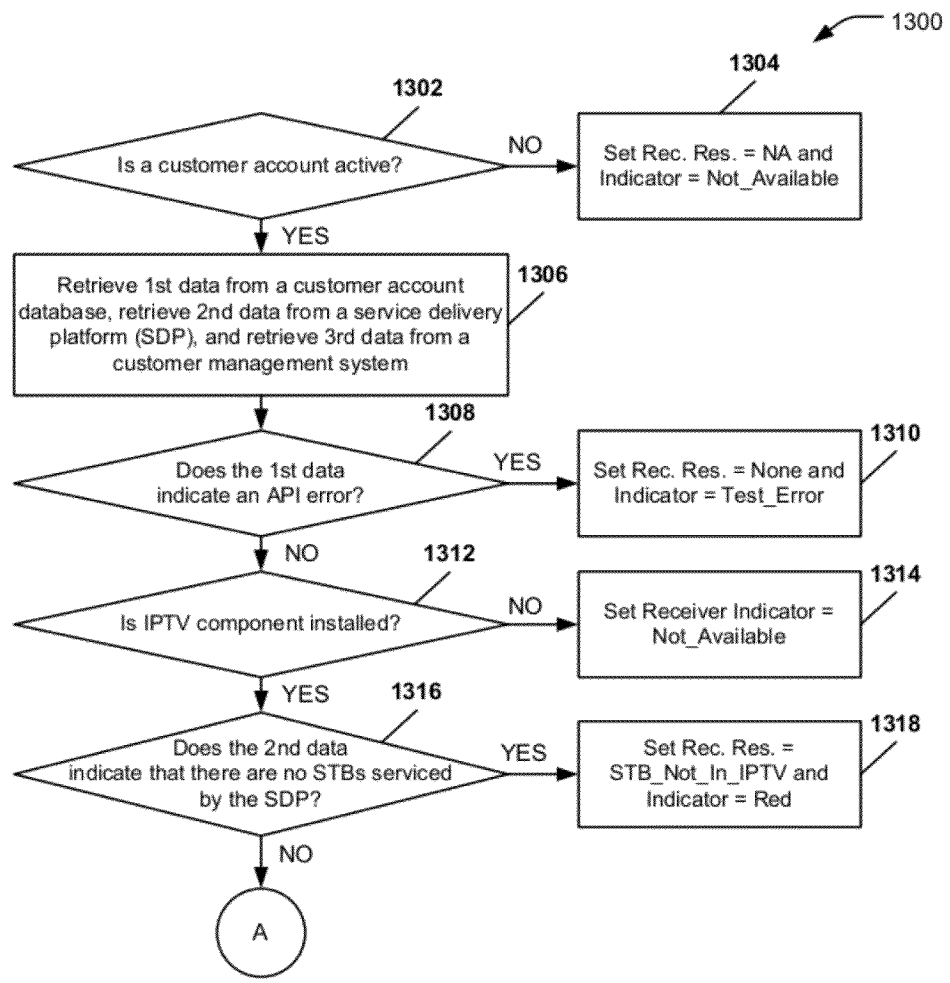
FIG. 13 is a first portion of a flow diagram of a sixth particular embodiment of a method to troubleshoot a set top box device.

Referring to FIG. 13, a first portion of a flow diagram of a sixth particular embodiment of a method to troubleshoot a set top box device is depicted and generally designated 1300.

The method 1300 begins when a determination is made whether a customer account is active, at 1302. When the determination is that the customer is not active, at 1302, the recovery reason is set to "not available" and an indicator is set to "not available", at 1304. When the determination is that the customer account is active, at 1302, first data is retrieved from a customer account database, second data is retrieved from a service delivery platform (SDP), and third data is retrieved from a customer management system, at 1306.

Proceeding to 1308, a determination is made whether the first data indicates an application programming interface (API) error. When the first data indicates an API error, at 1308, the recovery reason is set to "none" and the indicator is set to "test error", at 1310. When the first data does not indicate an API error, at 1308, a determination is made whether an Internet Protocol Television (IPTV) component is installed, at 1312. When the determination is that the IPTV component is not installed, at 1312, the receiver indicator is set to "not available", at 1314. When a determination is made that the IPTV component is installed, at 1312, a determination is made whether the second data from the SDP indicates there are no set top box devices, at 1316. When the determination is that the second data indicates that there are no set top box devices associated with the customer, then the recovery reason is set to "STB not in IPTV" and the indicator is set to "red", at 1318. The method then proceeds to 1402 of FIG. 14.

Figure 14:
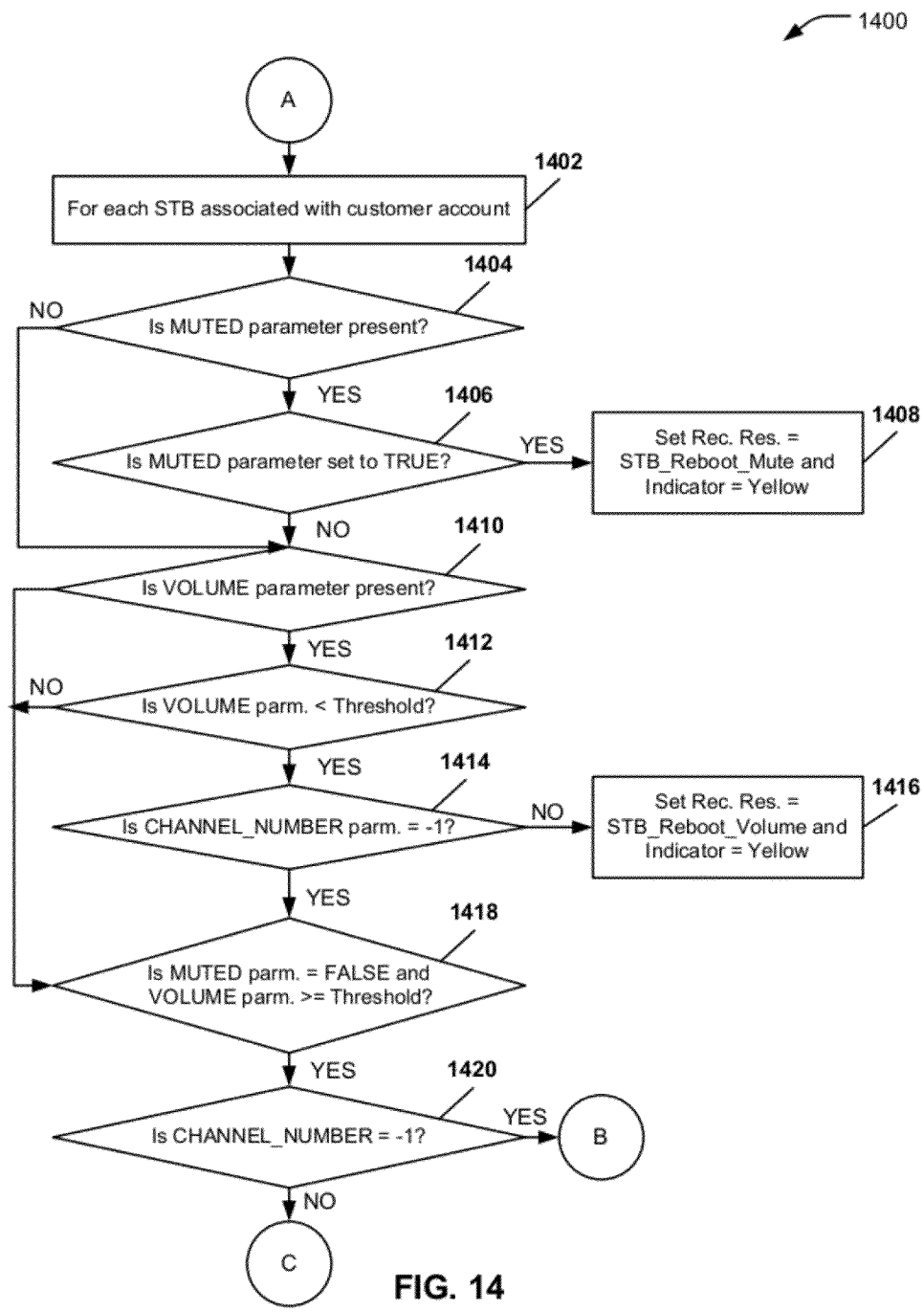
FIG. 14 is a second portion of a flow diagram of a sixth particular embodiment of a method to troubleshoot a set top box device.

Referring to FIG. 14, a second portion of the flow diagram of the sixth particular embodiment of the method to troubleshoot the set top box device is depicted and generally designated 1400. At 1402, for each set top box device associated with the customer account, various parameters are examined and indicators and recovery reasons are set based on the various parameters, as described below.

Advancing to 1404, a determination is made whether a muted parameter is present. When the muted parameter is determined to be present, at 1404, a determination is made whether the muted parameter is set to "true", at 1406. When the muted parameter is determined to be set to "true", at 1406, the recovery reason is set to "STB reboot mute", and the indicator is set to "yellow", at 1408. When the muted parameter is determined to be not set to "true", at 1406, a determination is made whether a volume parameter is present, at 1410. When the volume parameter is determined to be present, at 1410, a determination is made whether the volume is less than a threshold, at 1412. When the volume parameter is determined to be less than the threshold at 1412, a determination is made whether a channel number parameter is set to "−1", at 1414. When the determination is that the channel number is not set to "−1", at 1414, the recovery reason is set to "STB reboot volume" and the indicator is set to "yellow", at 1416.

When the determination is that the channel number is set to "−1", at 1414, a determination is made whether the muted parameter is set to "false" and the volume parameter is greater than or equal to the threshold, at 1418. When the determination is that the muted parameter set to false and the volume parameter is greater or equal to the threshold, at 1418, a determination is made whether the channel number is set to "−1", at 1420. When the channel number is determined to be set to "−1", at 1420, the method proceeds to 1502, of FIG. 15. When the channel number parameter is determined to be not set to "−1", at 1420, the method proceeds to 1506 of FIG. 15.

Figure 15:
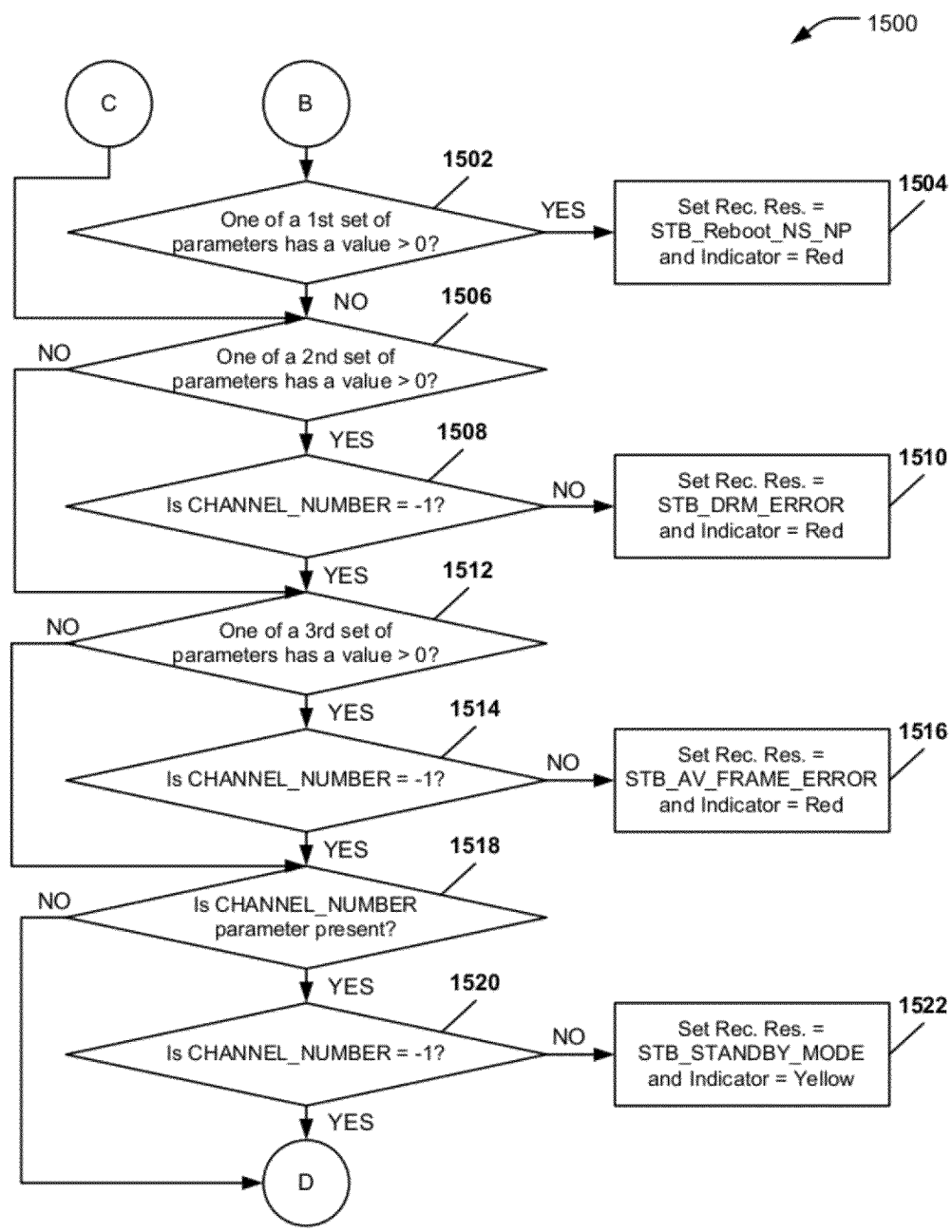
FIG. 15 is a third portion of a flow diagram of a sixth particular embodiment of a method to troubleshoot a set top box device.

Referring to FIG. 15, a third portion of the flow diagram of the sixth particular embodiment of the method to troubleshoot the set top box device is depicted and generally designated 1500.

A determination is made whether one of a first set of parameters has a value greater than zero, at 1502. For example, the first set of parameters may include parameters related to latency, such as receiver audio decoder errors, receiver audio digital signal processor (DSP) crashes, receiver decoder stalled, receiver discontinuities, receiver video decoder errors, receiver video DSP crashes, tuner hole too large, tuner packets expired, tuner parse errors, tuner hole without session, and receiver discontinuous packets. When one of the first set of parameters is determined to have a value greater than zero, the recovery reason is set to "STB reboot NS NP" and the indicator is set to "red", at 1504.

When none of the first set of parameters is determined to have a value greater than zero, a determination is made whether one of a second set of parameters has a value greater than zero, at 1506. For example, the second set of parameters may include parameters related to digital rights management (DRM), such as receiver audio cryptographic errors, receiver audio DRM errors, and receiver video DRM errors. When one of the second set of parameters is determined to have a value greater than zero, at 1506, a determination is made whether the channel number is set to "−1", at 1508. When the channel number is determined to be not set to "−1", at 1508, the recovery reason is set to a "digital rights management error" and the indicator is set to "red", at 1510.

When the channel number is determined to be set to "−1", at 1508, a determination is made whether one of a third set of parameters has a value greater than zero, at 1512. For example, the third set of parameters may include parameters related to frame errors, such as receiver video buffer underruns, receiver video First In First Out (FIFO) buffer read errors, and, receiver video FIFO write errors. When one of the third set of parameters is determined to have a value greater than zero, at 1512, a determination is made whether the channel number is set to "−1", at 1514. When the channel number is determined to be not set to "−1", at 1514, the recovery reason is set to "audio-video frame error" and the indicator is set to "red", at 1516. When the channel number is determined to be set to "−1", at 1514, a determination is made whether a channel number parameter is present, at 1518. When the channel number parameter is determined to be present at 1518, a determination is made whether the channel number is set to "−1", at 1520. When the channel number is determined to be set to "−1", at 1520, the method proceeds to 1602 of FIG. 16. When the channel number is determined to be not set to "−1", at 1520, the recovery reason is set to "STB standby mode", and the indicator is set to "yellow", at 1522.

Figure 16:
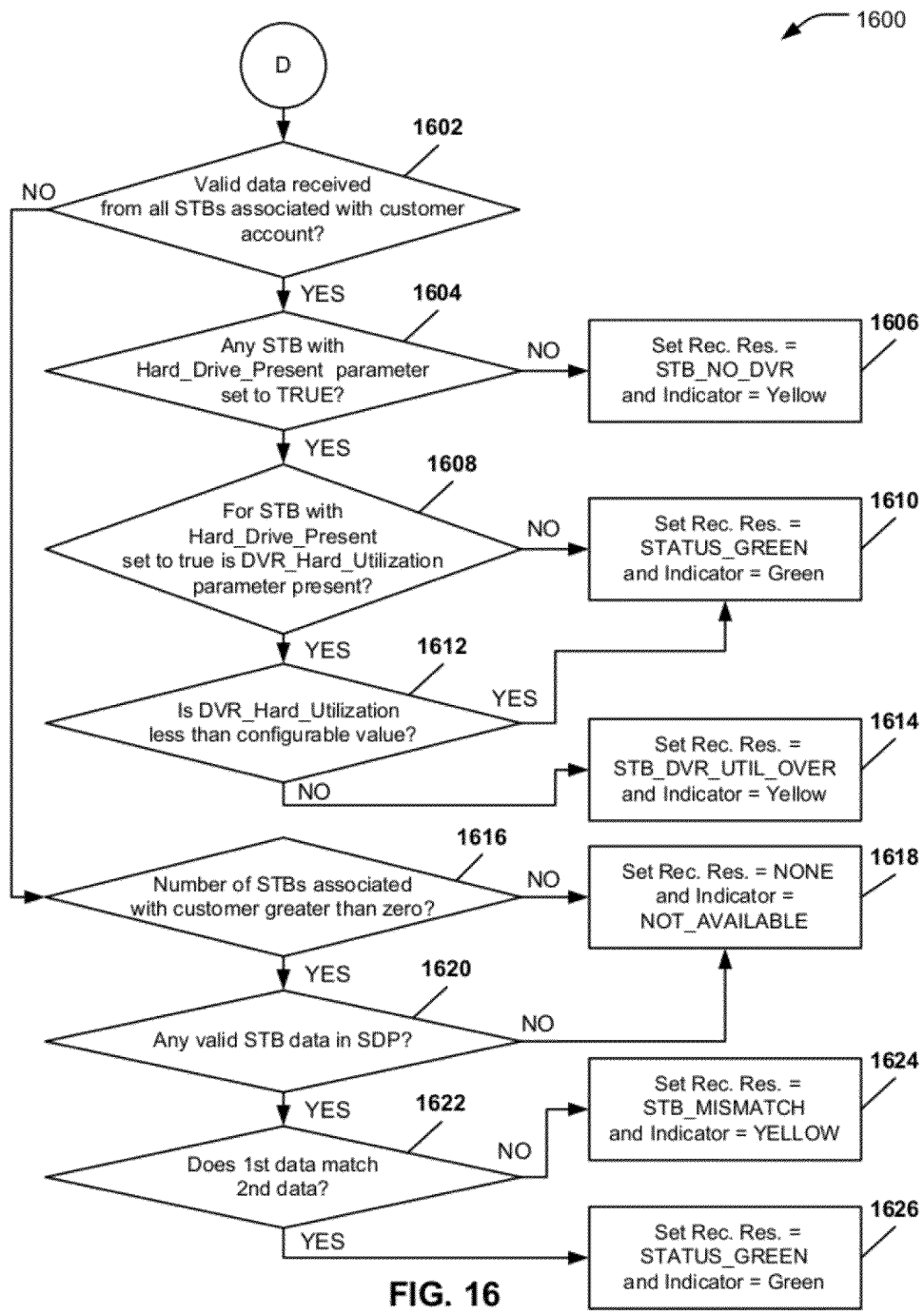
FIG. 16 is a fourth portion of a flow diagram of a sixth particular embodiment of a method to troubleshoot a set top box device.

Referring to FIG. 16, a fourth portion of the flow diagram of the sixth particular embodiment of the method to troubleshoot the set top box device is depicted and generally designated 1600.

A determination is made whether valid data is received from all the set top box devices associated with the customer account, at 1602. When the determination is that valid data has been received from all the set top box devices associated with the customer account, at 1602, a determination is made whether any set top box device has the "hard drive present" parameter set to "true", at 1604. When the "hard drive present" parameter is determined to be not set to "true", at 1604, the recovery reason is set to "STB no DVR" and the indicator is set to "yellow", at 1606. When at least one set top box device is determined to have the "hard drive present" parameter set to "true", at 1604, a determination is made, for each of the set top box devices with the "hard drive present" parameter set to "true", whether the "DVR hard utilization" parameter is present, at 1608. When the "DVR hard utilization" parameter is determined not to be present, at 1608, the recovery reason is set to "green" and the indicator is set to "green", at 1610.

When the set top box device with the "hard drive present" parameter set to "true" is determined to have the "DVR hard utilization" parameter, at 1608, a determination is made whether the "DVR hard utilization" parameter is less than a configurable value, at 1612. When it is determined the "DVR hard utilization" parameter is less than the configurable value, the recovery reason is set to "green" and the indicator is set to "green", at 1610. When the DVR hard utilization parameter is determined to be not less than the configurable value, the recovery reason is set to "STB DVR utilization over" and the indicator set to "yellow", at 1614.

When a determination is made that valid data was not received from all of the set top box devices associated with the customer account, at 1602, a determination is made whether the number of set top box devices associated with the customer is greater than zero, at 1616. When the number of set top box devices associated with the customer account is determined to be zero, the recovery reason is set to "none" and the indicator is set to "not available", at 1618. When the number of set top box devices associated with the customer account is determined to be greater than zero, at 1616, a determination is made whether any valid set top box device data associated with the customer account is in the service delivery platform, at 1620. When it is determined that there is no valid set top box data in the service delivery platform, at 1620, the recovery reason is set to "none" and the indicator is set to "not available", at 1618. When the determination is that there is valid set top box data in the service delivery platform, at 1620, a determination is made whether the first data matches the second data, at 1622. When the first data does not match the second data, at 1622, the recovery reason is set to "STB mismatch" and the indicator is set to "yellow", at 1624. When the first data matches the second data, at 1622, the recovery reason is set to "green" and the indicator is set to "green" at 1626.

Figure 17:
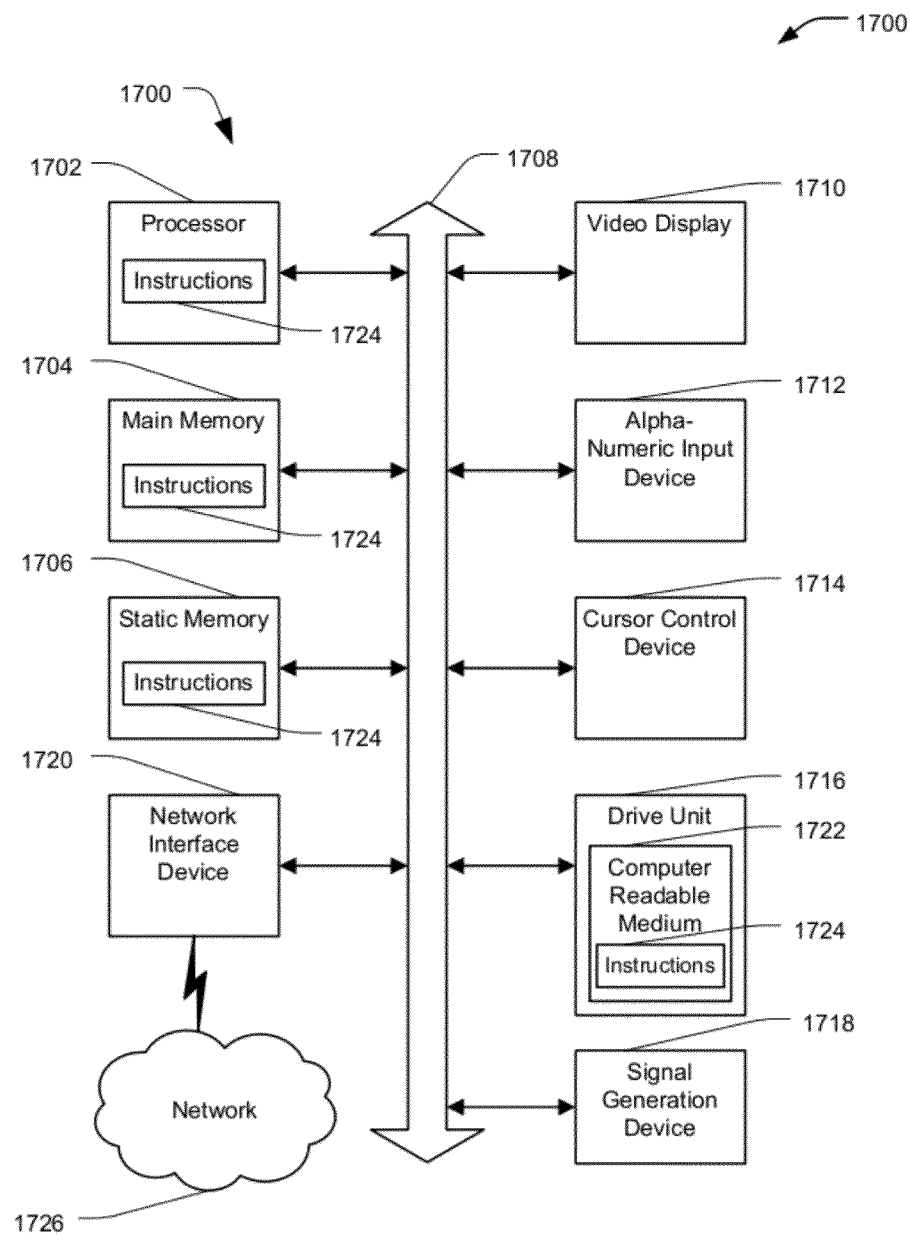
FIG. 17 is a block diagram of an illustrative embodiment of a general computer system.

Referring to FIG. 17, an illustrative embodiment of a general computer system is shown and is designated 1700. The computer system 1700 can include a set of instructions that can be executed to cause the computer system 1700 to perform any one or more of the methods or computer based functions disclosed herein. The computer system 1700, or any portion thereof, may operate as a standalone device or may be connected, e.g., using a network, to other computer systems or peripheral devices.

In a networked deployment, the computer system 1700 may operate in the capacity of a set top box device, or a server, such as an identification server, an electronic commerce server, an authorization server, or a media content server as described above with reference to FIG. 1-2. The computer system 1700 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 1700 can be implemented using electronic devices that provide voice, video or data communication. Further, while a single computer system 1700 is illustrated, the term "system" shall also be taken to include any collection of systems or sub-systems that individually or jointly execute a set, or multiple sets, of instructions to perform one or more computer functions.

As illustrated in FIG. 17, the computer system 1700 may include a processor 1702, e.g., a central processing unit (CPU), a graphics-processing unit (GPU), or both. Moreover, the computer system 1700 can include a main memory 1704 and a static memory 1706 that can communicate with each other via a bus 1708. As shown, the computer system 1700 may further include a video display unit 1710, such as a liquid crystal display (LCD), an organic light emitting diode (OLED), a flat panel display, or a solid-state display. Additionally, the computer system 1700 may include an input device 1712, such as a keyboard, and a cursor control device 1714, such as a mouse. The computer system 1700 can also include a disk drive unit 1716, a signal generation device 1718, such as a speaker or remote control, and a network interface device 1720.

In a particular embodiment, as depicted in FIG. 17, the disk drive unit 1716 may include a computer-readable medium 1722 in which one or more sets of instructions 1724, e.g. software, can be embedded. Further, the instructions 1724 may embody one or more of the methods or logic as described herein. In a particular embodiment, the instructions 1724 may reside completely, or at least partially, within the main memory 1704, the static memory 1706, and/or within the processor 1702 during execution by the computer system 1700. The main memory 1704 and the processor 1702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1724 or receives and executes instructions 1724, so that a device connected to a network 1726 can communicate voice, video or data over the network 1726. Further, the instructions 1724 may be transmitted or received over the network 1726 via the network interface device 1720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions.

Although the present specification describes components and functions that may be implemented in particular embodiments with reference to particular standards and protocols, the invention is not limited to such standards and protocols. For example, standards for Internet and other packet switched network transmission and video transmission (e.g., TCP/IP, UDP/IP, HTML, HTTP, MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A computer-implemented method, comprising:
   receiving, at a monitoring center of a media distribution network from a media device associated with a customer account, first error data indicating occurrence of a first error at the media device at a first time, wherein the media device is at least partially functional after occurrence of the first error;
   receiving, at the monitoring center, second error data indicating occurrence of a second error at the media device at a second time, wherein the media device is at least partially functional after occurrence of the second error;
   determining, with a processor of the monitoring center, an elapsed time between the first time and the second time;
   comparing the elapsed time between the first time and the second time to a first time threshold;
   when the elapsed time is less than the first time threshold, sending an automatically generated trouble ticket indicating a failure associated with the media device from the processor to a network operations center;
   when the elapsed time is greater than the first time threshold, determining an average elapsed time between errors at the media device for a particular time period, wherein the particular time period is greater than the first time threshold; and
   when the average elapsed time between errors at the media device is less than a second time threshold, sending the automatically generated trouble ticket to the network operations center.

2. The computer-implemented method of claim 1, further comprising, responsive to determining that the elapsed time is less than the first time threshold, automatically sending a notification message to a communication address associated with the customer account, the notification message indicating that the media device is to be repaired.

3. The computer-implemented method of claim 1, wherein the second threshold is greater than the first threshold.

4. The computer-implemented method of claim 1, further comprising automatically troubleshooting the media device at the monitoring center to identify a cause of the first error, the second error, or both.

5. The computer-implemented method of claim 4, wherein automatically troubleshooting the media device comprises:
when the first error, the second error, or both, indicate a problem at a home network, analyzing the home network to identify a root cause of the problem; and
when the root cause of the problem is associated with the media device, executing an automatic recovery procedure.

6. The computer-implemented method of claim 5, wherein executing the automatic recovery procedure comprises:
retrieving a parameter from the media device, wherein the parameter indicates a user adjustable setting of the media device;
selecting a recovery reason from a set of recovery reasons based on the parameter; and
sending a signal from the monitoring center to the media device, wherein the signal instructs the media device to set a recovery result indicator of the media device.

7. The computer-implemented method of claim 6, wherein the user adjustable setting is a volume setting.

8. The computer-implemented method of claim 6, wherein the user adjustable setting is a channel number setting.

9. The computer-implemented method of claim 6, further comprising:
retrieving an additional parameter from the media device, wherein the additional parameter is a count related to latency; and
selecting the recovery reason from the set of recovery reasons based further on the count having a value greater than a third threshold.

10. The computer-implemented method of claim 5, wherein executing the automatic recovery procedure comprises:
when the root cause of the problem is a missing decryption key, validating an identifier associated with the media device; and
sending a decryption key to the media device when the identifier associated with the media device is valid.

11. The computer-implemented method of claim 4, wherein automatically troubleshooting the media device comprises:
retrieving first data associated with the customer account from a customer account database;
retrieving second data associated with the media devices associated with a second customer from a service delivery platform; and
sending a signal from the monitoring center to the media device, wherein the signal instructs the media device to set a recovery result indicator of the media device based on a comparison of the first data and the second data.

12. A system, comprising:
a processor circuit; and
a memory comprising operational instructions that, when executed by the processor circuit, cause the processor circuit to perform operations including:
receiving, from a media device associated with a customer account, first error data indicating occurrence of a first error at the media device at a first time, wherein the media device is at least partially functional after occurrence of the first error;
receiving second error data indicating occurrence of a second error at the media device at a second time, wherein the media device is at least partially functional after occurrence of the second error;
determining an elapsed time between the first time and the second time;
comparing the elapsed time between the first time and the second time to a first time threshold;
when the elapsed time is less than the first time threshold, automatically generating a trouble ticket to indicate a failure associated with the media device;
when the elapsed time is greater than the first time threshold, determining an average elapsed time between errors at the media device for a particular time period, wherein the particular time period is greater than the first time threshold; and
when the average elapsed time between errors at the media device is less than a second time threshold, generating the trouble ticket.

13. The system of claim 12, wherein the first error data and the second error data identify a packet latency associated with media content packets that are received at the media device, and wherein the operations further include automatically generating the trouble ticket when the packet latency satisfies a third threshold.

14. The system of claim 12, wherein the first error data, the second error data, or both, identify a remaining memory capacity of a digital video recorder associated with the media device, and wherein the operations further include, when the remaining memory capacity satisfies a third threshold, automatically sending a notification to a communication address of a subscriber that is associated with the media device.

15. The system of claim 12, wherein the operations further include automatically sending a notification from a monitoring center to a communication address of a subscriber that is associated with the media device in response to generating the trouble ticket, wherein the notification includes one of an email message, an automated interactive voice response call, a pop-up message for display at a display device associated with the media device, or a text message.

16. The system of claim 15, wherein the notification includes a prompt to enable a corrective action to be taken.

17. A computer-readable storage device comprising operational instructions that, when executed by a processor, cause the processor to perform operations comprising:
receiving, from a media device associated with a customer account, first error data indicating occurrence of a first error at the media device at a first time, wherein the media device is at least partially functional after occurrence of the first error;
receiving second error data indicating occurrence of a second error at the media device at a second time, wherein the media device is at least partially functional after occurrence of the second error;
comparing an elapsed time between the first time and the second time to a first time threshold;
when the elapsed time is less than the first time threshold, automatically generating a trouble ticket to indicate a failure associated with the media device;
when the elapsed time is greater than the first time threshold, determining an average elapsed time between errors at the media device for a particular time period, wherein the particular time period is greater than the first time threshold; and
when the average elapsed time between errors at the media device is less than a second time threshold, generating the trouble ticket.

18. The computer-readable storage device of claim 17, wherein the media device is a set top box.

19. The computer-readable storage device of claim 18, wherein automatically troubleshooting the first error, the second error, or both, comprises automatically power cycling the media device, a digital video recorder associated with the media device, a residential gateway associated with the media device, or a combination thereof.

20. The computer-readable storage device of claim 17, wherein the operations further comprise automatically troubleshooting an issue associated with the first error data, the second error data, or both, by:
- after receiving the second error data, determining how many devices are associated with the customer account based on customer account data;
- sending a polling message to a device associated with the customer account;
- determining whether a response to the polling message is received; and
- determining a root cause of the issue based on receipt of the response to the polling message or lack of receipt of the response to the polling message.

* * * * *